(12) United States Patent
Marriott

(10) Patent No.: US 12,510,510 B2
(45) Date of Patent: Dec. 30, 2025

(54) METHOD AND APPARATUS FOR SEPARATING IONS

(71) Applicant: Thermo Electron Manufacturing Limited, Cheshire (GB)

(72) Inventor: Philip Marriott, Buxton (GB)

(73) Assignee: Thermo Electron Manufacturing Limited, Hertfordshire (GB)

( * ) Notice: Subject to any disclaimer, the term of this patent is extended or adjusted under 35 U.S.C. 154(b) by 552 days.

(21) Appl. No.: 17/798,809

(22) PCT Filed: Feb. 10, 2021

(86) PCT No.: PCT/GB2021/050306
§ 371 (c)(1),
(2) Date: Aug. 10, 2022

(87) PCT Pub. No.: WO2021/161013
PCT Pub. Date: Aug. 19, 2021

(65) Prior Publication Data
US 2023/0089568 A1 Mar. 23, 2023

(30) Foreign Application Priority Data
Feb. 10, 2020 (GB) .................................. 2001790

(51) Int. Cl.
*G01N 27/622* (2021.01)
*H01J 49/00* (2006.01)
*H01J 49/02* (2006.01)
*H01J 49/26* (2006.01)

(52) U.S. Cl.
CPC ........ *G01N 27/622* (2013.01); *H01J 49/0031* (2013.01); *H01J 49/004* (2013.01); *H01J 49/025* (2013.01); *H01J 49/26* (2013.01)

(58) Field of Classification Search
CPC .... G01N 27/622; G01N 27/62; G01N 27/624; H01J 49/0031; H01J 49/004; H01J 49/025; H01J 49/26
USPC ...................................... 250/281, 282, 287
See application file for complete search history.

(56) References Cited

FOREIGN PATENT DOCUMENTS

WO WO-0122049 A2 * 3/2001 ........... G01N 27/622

* cited by examiner

*Primary Examiner* — Michael Maskell

(57) ABSTRACT

A method of separating a sample of ions according to their ion mobilities is provided. The method comprises receiving the sample of ions into a drift tube; applying a first electric field component within the drift tube so as to cause the sample of ions to move along a path within the drift tube, whereby the sample of ions separates along the path; and applying a second electric field component within the drift tube. The first and second electric field components have a combined electric field strength to modify the ion mobility of at least a portion of the sample of ions and to increase the separation of at least a portion of the sample of ions along the path The second electric field component substantially does not cause a net change in the velocity of the sample of ions perpendicular to the path. An apparatus for separating a sample of ions according to their ion mobilities is also provided.

27 Claims, 13 Drawing Sheets

METHOD AND APPARATUS FOR SEPARATING IONS

FIELD

The present disclosure relates generally to a method and apparatus for separating ions, to methods for performing ion mobility spectrometry or obtaining differential mobility analyser (DMA) data sets, and to identification of species.

BACKGROUND

It is known that ions can be driven to move through a gas by the application of an electric field. If the gas pressure is high enough to cause frequent collisions between the ions and the gas molecules along an ion flight path, then the ions are accelerated until they travel at a constant average velocity. Ion mobility quantifies the tendency of an ion to move through a medium in response to an applied electric field. The velocities that ions attain is dependent on a number of properties of the system, including the type of gas used and the pressure at which the gas is maintained, the properties of the applied electric field (e.g. its electric field strength), and the characteristics of the ions that give rise to them having a particular ion mobility.

In drift-tube ion mobility spectrometry (DT-IMS), a relatively long gas filled tube has a constant and relatively low electric field applied along and substantially parallel to the axis of the tube. A pulse of sample ions is released at one end and is driven to the other end by the field towards a detector that detects the ions' arrival times. Where the sample of ions contains different species, the different species of ions will typically possess different ion mobilities, which causes the ions to arrive at the detector at different and characteristic times. The resulting time-of-flight spectrum can be used as an indicator of the ion species within the sample.

A conventional ion mobility drift tube has a voltage gradient along the length of the tube. The gradient is often constant but might vary along the axial length of the tube. The voltage gradient is time-invariant and relatively low in strength.

As with time-of-flight (TOF) mass spectrometry (MS), the entire spectrum of ion species can be detected for each pulse. A pulse of ions is used, and ions are permitted to enter the drift tube only once the previous pulse has been detected, which limits the throughput. Furthermore, resolution is limited. Even if an extremely small duration pulse width can be achieved for releasing the ion packet, ion diffusion limits the resolving power of the final spectrum. It is known that diffusion increases at high field strengths, reducing the resolving power still further. Thus, drift tube fields are typically held below the limit at which changes in ion mobility start to occur.

A further method that utilises differences in ions' mobilities to extract information about the ions is Field Asymmetric Waveform Ion Mobility Spectrometry (FAIMS) or differential mobility spectrometry (DMS). FAIMS is usually conducted by transmitting ions through a gas in a channel in which an asymmetrical time-varying electric field is applied perpendicular to the ions' axis of travel. The axis might lie between flat parallel plates or between curved electrodes shaped as parts of or as complete cylinders, with the ions travelling parallel to the axis of the cylinders. In the case of curved electrodes, the axis along which ions move may be or include a curved axis.

At a given gas number density (denoted N), the applied electric field (denoted E), and hence the ratio E/N (sometimes described as the normalised electric field strength), is set to be large enough for ions to reach or exceed the speed of sound in the gas during at least part of the oscillation cycle. It is known that ion mobilities typically change at such velocities, either decreasing or increasing from their values in low E/N fields. The time-varying electric field causes the ions to move through the gas first in one direction perpendicular (e.g. towards one electrode) to the axis with a first peak field strength for a first time period, and then in the opposite direction (e.g. towards an opposing electrode) for a second time period with a second peak field strength. The time periods and the peak electric field strengths are set so that the net time period multiplied by electric field strength over the cycle is zero. However, the first and second peak field strengths (of opposite polarity) have different magnitudes, and this asymmetry in the electric field strength means that ions have different mobilities when travelling in the two opposing directions. Hence, ions undergo net motion perpendicular to the axis after every cycle.

Different species of ions have different mobilities and also different dependencies of their ion mobility as a function of E/N. As ions traverse the spectrometer along the axis, some ions are deflected off the axis to strike one or other of the sidewalls of the channel (which are usually electrodes). Only ions that have not been driven substantially off the axis are retained and detected, leading to a bandpass filtering action whereby only certain ions are detected with other ions striking the electrodes. A FAIMS device is illustrated in U.S. Pat. No. 9,880,129, which discloses several configurations. In one configuration, ions entering the ion mobility drift tube are filtered by a FAIMS filter. In another configuration, ions entering the FAIMS filter have passed through the ion mobility tube. In each case, FAIMS filtering is employed.

Other devices that operate according to similar principles are known. For example, U.S. Pat. No. 9,899,200 describes a device to operate at sub-ambient pressures in which ions move in a first direction and are separated in a second direction according to a physiochemical property, such that ions having a first value or range of values of the physiochemical property exit the device through an exit aperture. Ions that do not have physiochemical properties that correspond with the first value or range of values do not pass through the exit aperture.

U.S. Pat. No. 8,378,297 describes an ion mobility tube to which a transverse time-varying electric field is applied. The frequency of the transverse electric field is matched to the flight time of an ion through the ion mobility tube such that only ions of given flight times are deflected firstly off the axis and then back onto the axis in time to exit the mobility tube through an aperture.

U.S. Pat. No. 5,789,745 describes an ion mobility spectrometer using a frequency domain technique, in which certain ions are selectively transported along a tube whilst other ions are discriminated against. Time of flight separation is replaced by frequency domain separation. A moving potential well pushes ions with mobilities greater than a certain threshold towards a detector plate, whilst other ions remain close to their place of generation or are oppositely directed.

There are several drawbacks to prior art devices. Resolution in conventional DT-IMS is limited. Moreover, FAIMS-type devices have limited throughput and FAIMS filtering is performed on the basis of the change in mobility that an ion has under the influence of a given waveform, which is a measure of the differential ion mobility and not the ion mobility itself. Differential ion mobility spectra can be complex and there is relatively little data on ion mobility variance for most ions due to the difficulties in obtaining spectra in conventional devices.

It is therefore an object of this disclosure to address these and other problems with prior art systems.

SUMMARY

Against this background, a method of separating a sample of ions according to their ion mobilities is provided, as defined in claim 1.

In general terms, ions are exposed to a first electric field component in a space through which they travel, causing the ions to travel through a drift tube. By applying a second electric field component to the space in which the ions travel (or a portion thereof) the mobility possessed by each ion can be modified. When ions experience a second electric field component superimposed with the first electric field component, the combination of the first and second electric field components may cause the total velocity (the speed) of the ions to be sufficient for their ion mobilities to vary.

Causing the ions to reach such speeds so as to modify the ions' mobility can be achieved by an electric field having various forms. For instance, the first electric field component can be a drift tube electric field and the first direction can be the same as or different from a second direction. For example, the second electric field component may cause the ions to move (at least temporarily) transversely away from the path. Alternatively, the second electric field component may accelerate the ions along the path without causing any transverse movement. In each case, the ions are not caused to gain any substantial net velocity perpendicular to a path within the drift tube.

The path may be an axis in the drift tube or an arbitrary line that is contained within the drift tube. The path is not necessarily the trajectory that is actually traversed by the ions, because the ions may deviate from the path (either due to diffusion or due to the effects of the applied second electric field component). For example, the path may be considered to be the trajectory that an ion would follow under the influence of a first electric field component in the absence of a second electric field component, any diffusion, and/or any gas flow.

At low electric field strengths, ions of interest can have closely similar ion mobilities to those of interfering ions. At low field strengths such as may be provided by the first field component, ions of interest may not be separated from interfering ions by the resolving power of an ion mobility spectrometer. The second applied electric field component may therefore be of a magnitude such that when combined with all other electric field components present (including the first field component), the total field strength exceeds the level at which ions of interest and interfering ions have ion mobilities that differ by a large enough extent for their arrival times to differ substantially and therefore for the ions to be distinguishable.

The present disclosure also provides differential mobility analysers (DMAs) and methods for obtaining DMA data sets that may benefit from the methods described herein. For instance, ion separation can be enhanced by combining electric field components that modify ions' mobilities with gas flow within a drift tube. This allows ion separation to be increased and also for the degree of ion separation to be controlled by (at least) two independent variables (e.g. the nature of the gas flow and the nature of the second electric field component).

The present disclosure therefore provides enhanced separation of ions relative to conventional DT-IMS. Moreover, in FAIMS devices, most ions are filtered out and lost and the proportion lost increases with resolving power, in contrast with the methods and apparatus of this disclosure which do not cause net motion perpendicular to the first direction. As a result of this, to obtain a spectrum in FAIMS, the bandpass must be scanned (reducing throughput) and the sensitivity is much lower than that of IMS.

Consequently, it can be seen that the disclosure provides improvements over prior art DT-IMS and FAIMS devices. Further features and advantages will be apparent from the appended claims and the following description.

LISTING OF FIGURES

Embodiments will now be described, by way of example only, with reference to the accompanying drawings in which.

DETAILED DESCRIPTION

Figure 1:
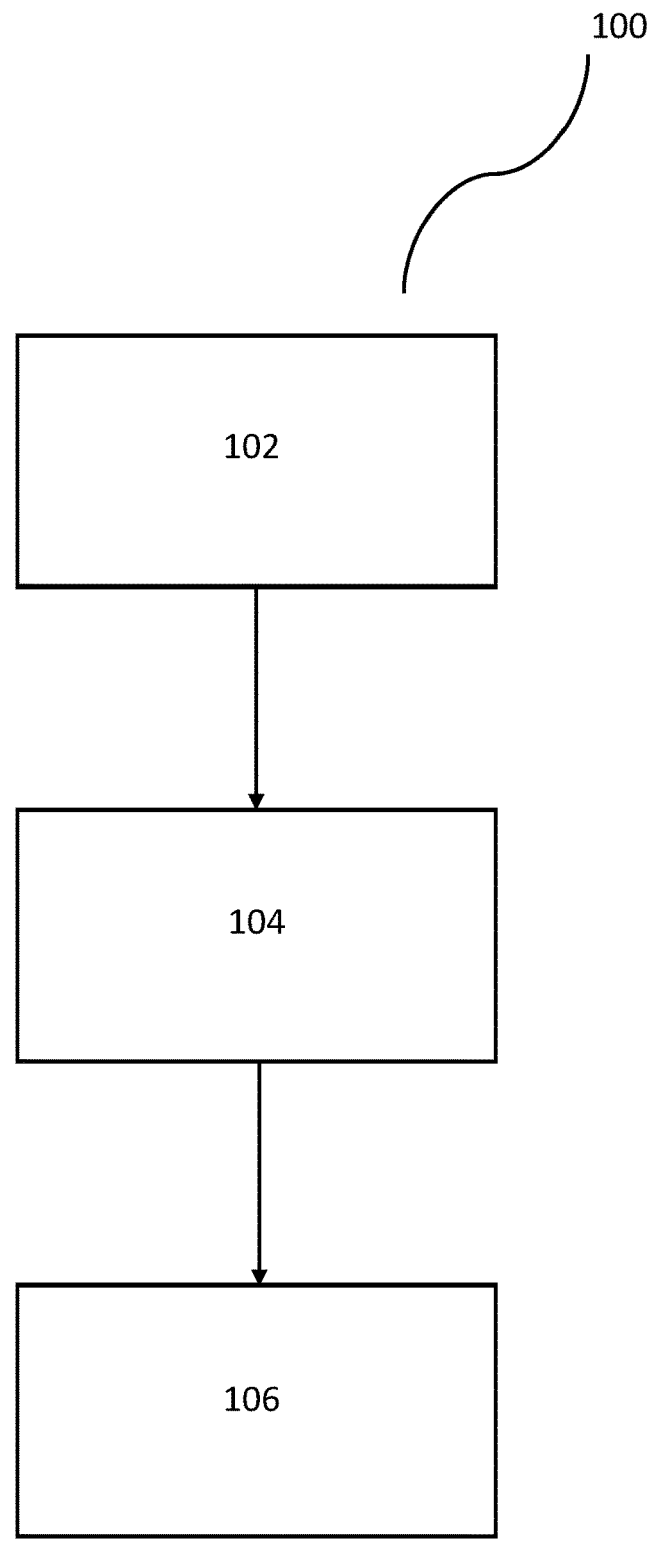
FIG. 1 shows a schematic diagram of a method of separating a sample of ions according to a first embodiment.

A first embodiment of a method 100 of separating a sample of ions according to their ion mobilities is depicted in FIG. 1. The embodiment depicted in FIG. 1 is a generalised method 100 that comprises the steps of receiving 102 the sample of ions, applying a first electric field component 104 and applying a second electric field component 106. The step of receiving 102 the sample of ions involves receiving the sample of ions into a drift tube containing a gas, such as air or nitrogen, for example. Applying 104 a first electric field component comprises applying a first electric field component within the drift tube so as to cause the sample of ions to move along a path within the drift tube (including in the absence of any gas flow), whereby the sample of ions separates along the path. The step of applying 106 a second electric field component comprises applying a second electric field component within the drift tube. The first and second electric field components have a combined electric field strength so as to modify the ion mobility of at least a portion of the sample of ions and to increase the separation of at least a portion of the sample of ions along the path. The second electric field component substantially does not cause a net change in the velocity of the sample of ions perpendicular to the path. The second electric field component may: be the same strength as the first electric field component; have a higher electric field strength than the first electric field component; or have a lower electric field strength than the first electric field component. For example, in some cases, the second electric field component may have a higher electric field strength than the first electric field component, to modify the ion mobility of at least a portion of the sample of ions and to cause at least a portion of the sample of ions to move away from the path.

When the method 100 of FIG. 1 is applied to a sample of ions, the application of the first electric field component causes ions to drift generally along a path within the drift tube (for example, along the drift tube axis, although the path could be any other path inside the drift tube), similarly to conventional DT-IMS. Hence, different ionic species within the sample move along the path at different velocities, based on their respective ion mobilities. The fact that different ions drift along the path at different velocities leads to the sample of ions separating as the ions move along the path and hence also produces a separation in their arrival times at the end of the drift tube (or at a detector at the end of the drift tube).

The path may be an axis (which could be straight or curved) in the drift tube, or an arbitrary three-dimensional line that is contained within the drift tube. For instance, the path may be the trajectory along which ions would move under the influence of just the first electric field component with no second electric field component applied and without any diffusion occurring.

The application of the second electric field component in combination with the first electric field component is such that ions undergo changes in mobility, meaning that the degree of separation of the sample can be enhanced (relative to separation performed in the absence of a second electric field component). The second electric field component may cause the ions to deviate from the path that they would follow under the influence of only the first electric field component. For example, ions may deviate from the path by oscillating about the path. As not all ions' mobilities vary in the same way as a function of applied field strength, the manner in which the ions' separations vary with the second electric field component can also provide valuable information about the sample. It is not necessary for the second electric field component alone to have a high enough field strength to cause a change in ion mobility. Rather, it is the electric field strength of the electric field resulting from the superposition of the first and second electric field components causes ions to undergo a change in mobility. The devices of this disclosure separate ions through the use of non-linear ion mobility, which occurs at high values of normalised electric field (E/N). In the linear mobility regime (i.e. below the mobility variance regime), the mobility coefficient at low field is constant, which gives a linear relationship between ion velocity and field strength. At sufficiently high fields, ions move into a mobility variance region, where the coefficient becomes non-linear.

Figure 2:
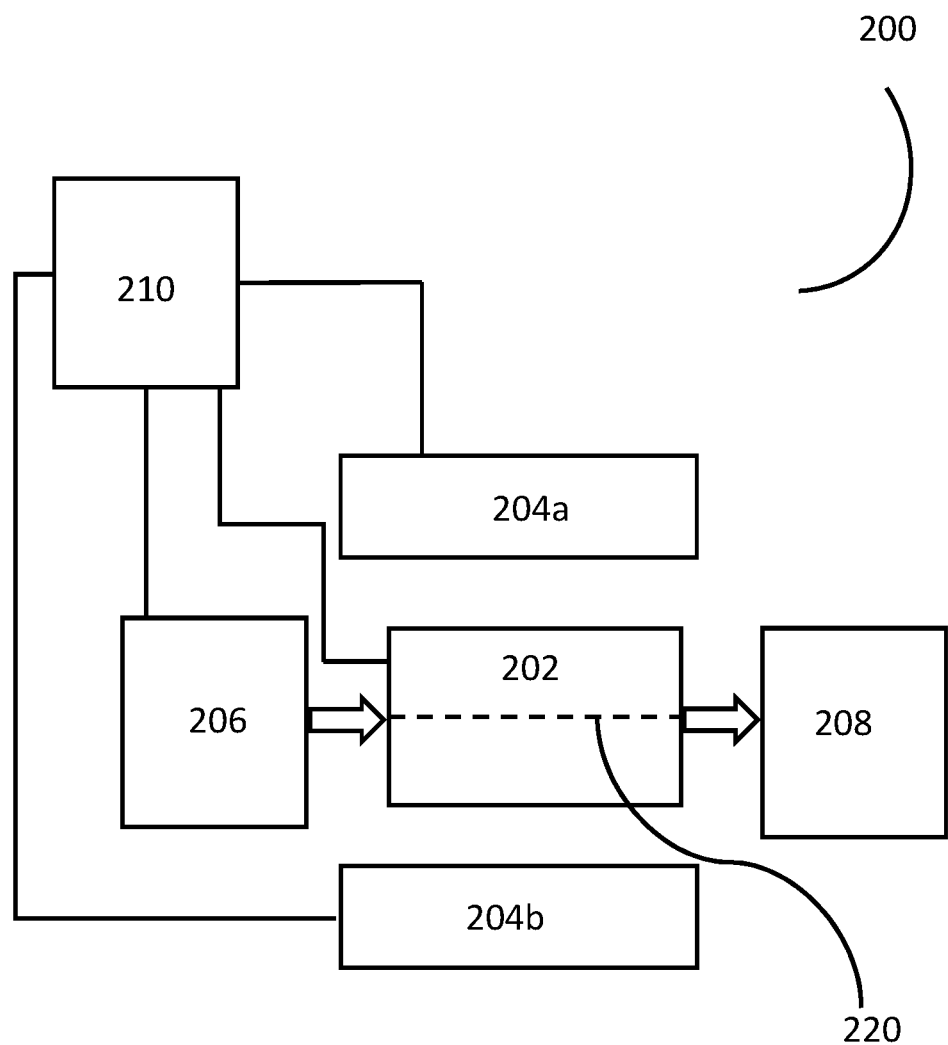
FIG. 2 shows a schematic diagram of an apparatus for performing the method of the first embodiment.

In FIG. 2, there is shown a schematic diagram of an apparatus 200 capable of performing the generalised method 100 depicted in FIG. 1. The apparatus 200 in FIG. 2 comprises an ion source 206 for introducing a sample of ions into a drift tube 202. A path 220 is defined within the drift tube 202 and extends between the ion source 206 and a detector 208. In FIG. 2, the path 220 is along the axis of the drift tube 220. Therefore, the axis of the drift tube 202 is not illustrated, for simplicity. However, the path 220 can be entirely distinct from the axis (e.g. the path 220 can be offset from and/or not parallel with the axis). The arrangement in FIG. 2 has an ion source 206 and a detector 208 respectively positioned at an inlet and outlet of the drift tube 202, with the path 220 extending out of the ends of the drift tube 202 to the ion source 206 and to the detector 208. Two electrodes 204a and 204b are disposed adjacent the drift tube 202 and together form an electrode arrangement 204 for applying an electric field (e.g. the electric field resulting from the superposition of the first and second electric field components applied when the method 100 of FIG. 1 is performed) within the drift tube 202. A controller 210 is shown coupled to the drift tube 202, the electrode arrangement 204, the ion source 206 and the detector 208.

In use, the apparatus 200 depicted in FIG. 2 analyses a sample of ions. The ion source 206 provides a pulsed sample of ions for separation. The ion source may inherently produce pulses of ions (e.g. a MALDI source) or it may initially produce ions continuously (e.g. an electrospray ion source) from which a pulsed sample of ions is generated, for example using a pulsed ion gate, pulsed orthogonal accelerator, or an ion trap having pulsed ejection. The sample of ions is introduced from the ion source 206 into the drift tube 202, following which the controller 210 causes the electrode arrangement 204 to apply first and second electric field components within the drift tube 202. As in the method 100 depicted in FIG. 1, the application of the first electric field component causes the sample of ions to move along the path 220 and the application of the second electric field component causes ions' mobilities to change whilst substantially not causing a net change in the velocity of the sample of ions perpendicular to the path 220. The ions could, for example, oscillate either side of the path 220 whilst not gaining any net velocity perpendicular to the path 220. Thus, the sample of ions is separated as it moves along the path 220. The path 220 extends towards the detector 208, which detects ions incident thereupon. As the ions are separated as they travel along the path 220, ions reach the detector 208 at a plurality of times. Accordingly, the detector 208 records data indicative of the number of ions incident thereupon over time. This data may be stored in the form of an ion mobility spectrum. The data may be stored in a database.

The controller 210 is coupled to each of the drift tube 202, the electrode arrangement 204, the ion source 206 and the detector 208. Accordingly, the controller can be used to control the operations of each component of the apparatus 200 and/or to send/receive data (e.g. operating parameters and/or measurements) to/from each component of the apparatus 200. For instance, the controller 210 can control the pressure, temperature and/or gas flow rate within the drift tube 202.

Moreover, the controller 210 controls the properties (including, for example, phase, amplitude, frequency, waveform) of the voltages or fields applied to the electrodes in order to generate the first and second electric field components. The controller 210 can also control the operation of the detector 208, for instance by activating and deactivating the detector 208 and/or controlling by its sensitivity.

Hence, the controller 210 may record further data in addition to the data indicative of the number of ions incident upon the detector 208 over time. For example, the controller 210 can also record some or all of the operating parameters of the drift tube 202, the electrode arrangement 204, the ion source 206 and/or the detector 208. These operating parameters can be stored in association with the data indicative of the number of ions incident upon the detector 208 (which could be stored in the form of a spectrum).

It will be appreciated that a number of variations to the apparatus of FIG. 2 can be made. For example, the controller may not be coupled to the ion source 206 and/or the detector 208. This will be the case if these components are provided separately or if their operations are to be controlled separately to the other components of the apparatus 200.

Moreover, the specific arrangement depicted in FIG. 2 is schematic and provided for the purposes of illustration only. For instance, various different geometries for the drift tube 202 and/or electrode arrangement 204 can be employed. In particular, there is no requirement for the drift tube 202 to have a straight axis or for the path 220 along which ions move to be straight. A curved drift tube 202 could be employed, in which case the path 220 within the drift tube 202 could be a curved path. In this context, a curved path can include a cyclic or helical path. Moreover, in such a case, the electrode arrangement 204 could also be curved, for instance having a similar general shape to the drift tube 202. There is also no need for the ions to travel along the drift tube axis. The path 220 can be a path 220 within the drift tube that is entirely distinct from the axis of the drift tube 202.

The electrode arrangement 204 is depicted as having only two electrodes 204a and 204b, but it may have any number of electrodes of any type or shape. As shown in FIG. 2, the electrodes 204a and 204b are separate from the walls of the drift tube 202, but the electrodes 204a and 204b could define the edges of the drift tube 202. For example, the electrodes may be integrally formed with or affixed to the walls of the drift tube 202.

Furthermore, the apparatus 200 of FIG. 2 can be used in conjunction with other types of devices that are not depicted for the sake of simplicity. For example, the apparatus 200 could be combined with a mass spectrometer so as to provide ion-mobility spectrometry-mass spectrometry (IMS-MS) capabilities.

It will also be appreciated that the apparatus 200 of FIG. 2 is depicted as including features that could be omitted whilst still providing an advantageous apparatus for separating ions. Specifically, the apparatus 200 is depicted as having an ion source 206 and a detector 208, but the apparatus 200 could instead be provided as a standalone instrument for use with existing ion sources and/or detectors. That is to say, the apparatus 200 depicted in FIG. 2 is an ion mobility spectrometer, but the apparatus 200 could entirely omit the ion source 206 and/or the detector 208. In such a case, the path 220 may extend between an inlet and an outlet of the drift tube 202. The inlet and/or outlet of the drift tube 202 could then be coupled respectively to an external ion source and/or detector. In an alternative embodiment, the outlet of the drift tube 202 could be coupled to a mass spectrometer for $MS^1$, $MS^2$ and/or $MS^n$ mass analysis of the separated ions.

Hence, in generalised terms, the present disclosure provides an apparatus for separating a sample of ions according to their ion mobilities. The apparatus comprises: a drift tube for receiving the sample of ions; an electrode arrangement; and a controller. The controller is configured to: cause the electrode arrangement to apply a first electric field component within the drift tube so as to cause the sample of ions to move along a path within the drift tube, whereby the sample of ions separates along the path; and cause the electrode arrangement to apply a second electric field component within the drift tube, the first and second electric field components having a combined electric field strength so as to modify the ion mobility of at least a portion of the sample of ions and to increase the separation of at least a portion of the sample of ions along the path, the second electric field component substantially not causing a net change in the velocity of the sample of ions perpendicular to the path.

Methods and apparatus such as those depicted in FIGS. 1 and 2 provide improved resolution when compared with conventional DT-IMS arrangements, due to the use of a second electric field component to alter ions' mobilities and hence control the degree of separation. The use of a second electric field component in combination with the first electric field component causes changes to the separation of ions on the basis of their differential ion mobility. Moreover, high throughput and efficiency are obtained by providing a second electric field component that does not cause ions to strike the electrodes 204 and/or the walls of the drift tube 202 by virtue of not gaining a net velocity perpendicular to the path 220 within the drift tube.

In these generalised terms, the path may extend between an inlet of the drift tube and an outlet of the drift tube. The path may be a curved path or a straight path. The path may be an axis within the drift tube and the path may be the longitudinal drift tube axis. The path can also be a path within the drift tube that is distinct from the drift tube axis. In cases where the path is an axis, the axis itself can be curved or can be curved for a portion of its length. In each case, ions generally move along the path under the influence of the first electric field component.

The drift tube may define an axis extending in a first direction, with the first electric field component being along the drift tube in the first direction so as to cause the sample of ions to move in the first direction, and the second electric field component substantially not causing a net change in the velocity of the sample of ions perpendicular to the first direction.

Figure 3:
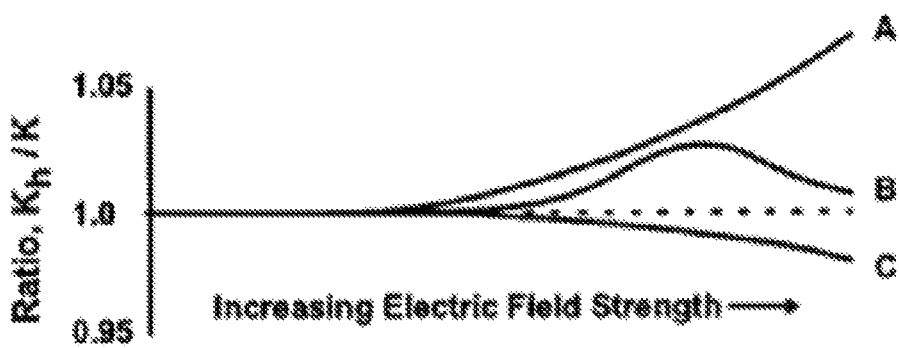
FIG. 3 shows a schematic diagram illustrating different types of ion mobility dependence on applied electric field.
Figure 4:
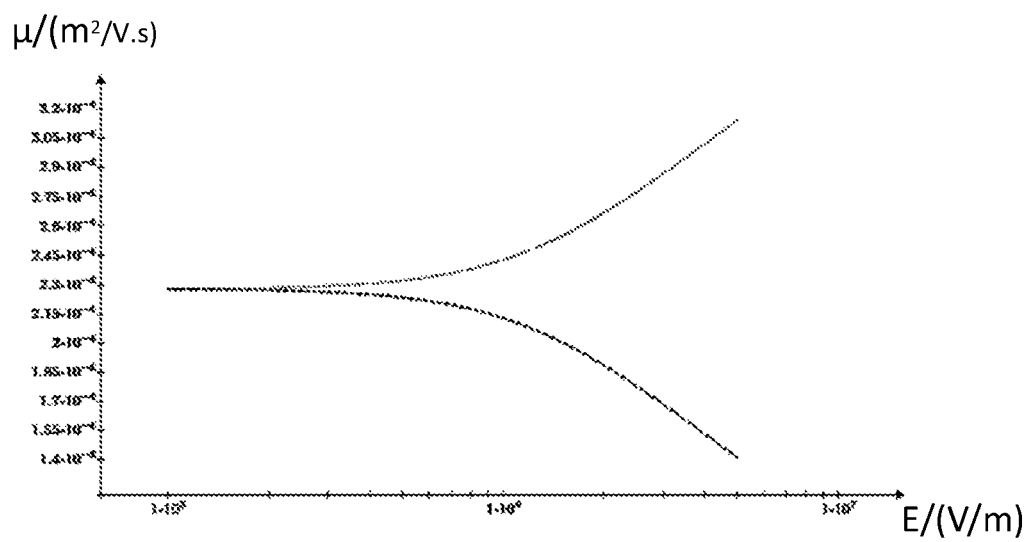
FIG. 4 shows simulated plots of ion mobility against electric field strength.

Turning next to FIGS. 3 and 4, depicted are diagrams illustrating principles of ion mobility that underpin the method and apparatus of FIGS. 1 and 2. In FIG. 3, a schematic diagram is depicted illustrating different types of ion mobility dependence on applied electric field. Ion mobility can generally be classified into one of three types: A, B or C. The vertical axis of the plot shows the ratio of the mobility in a given strength field, $K_h$, to the mobility in the absence of a field, K. The horizontal axis shows the applied electric field strength.

Type A and C ions show generally similar but opposite behaviour as a function of increasing field strength, with type A ions exhibiting increasing mobility as field strength increases and type C ions exhibiting decreasing mobility as field strength increases. Type B ions initially exhibit increasing mobility with increasing field strength before the mobility then starts to decrease above a certain applied field strength. The different types of ion mobility are discussed in greater detail in, for example, Guevremont and Purves, Rev. Sci. Inst. V70, N2, 1370 (1999). The methods and apparatus of the present disclosure are applicable to ions having any of the three types of ion mobility, as demonstrated and discussed in further detail below.

Mobility variance of type C ions can be simulated using a reduced mean time between collisions as the ion velocity increases. Simulated type A behaviour can be modelled using the inverse of the type C relationship. At very high fields (for instance $>>10^{10}$ V/m), the mobility of the simulated type A behaviour tends to twice the low-field mobility. As discussed previously, the devices of this disclosure separate ions through the use of non-linear ion mobility, which occurs at high values of normalised electric field (E/N).

In FIG. 4, simulated plots of mobility (m²/V·s) are provided against electric field strength (V/m) of singly charged ions of mass 100 Da and diameter $9.08 \times 10^{-10}$ m in air at room temperature and atmospheric pressure. In FIG. 4, a first ion is of simulated type C mobility variance, shown as a dashed trace, and a second ion is of simulated type A, shown as a dotted trace. This simulated behaviour is equivalent to the ion mobility relation of Equation (1) which is known to be applicable at low to moderate E/N (see for example E. A. Mason and E. W. McDaniel, Transport Properties of Ions in Gases, Wiley, New York, 1988). This simulated behaviour can be derived using two terms in Equation (1) where $\alpha_2$ term is $-5 \times 10^{-5}$ and the $\alpha_4$ term is $5 \times 10^{-9}$ for type C behaviour, mass 100 Da, and these coefficients are multiplied by −1 for ions of type A behaviour also having a mass 100 Da. In this case, all higher order $\alpha$ terms are set to zero. For simplicity, in this model the zero-field reduced mobility for type A and type C ions is taken to be precisely the same, although this is not necessarily the case.

$$\mu = \mu_0 \cdot \left(1 + \alpha_2 \cdot \left(\frac{E}{N}\right)^2 + \alpha_4 \cdot \left(\frac{E}{N}\right)^4 + \ldots \right) \quad \text{Equation (1)}$$

The mobility variance defined in Equation (1) is very similar to the mobility variance plotted in FIG. 4 for electric field strengths of up to $10^6$ V/m, where the difference is less than 0.1%. At higher field strengths, the error becomes larger as more terms in the polynomial are required. For simplicity, the simulation results presented herein use maximum field strengths of $\leq 1 \times 10^6$ V/m. Different values for the $\alpha$ terms are required for different ion species, being a function of both mass and ion diameter.

Throughout this disclosure, approximations to Equation (1) are employed with simplifying assumptions made to aid understanding. However, it will be appreciated that the methods and apparatus disclosed herein are generally applicable to ions having various mobility profiles, even in cases where ions exhibit complex mobility relationships. Advantages in terms of improved separation of ions can be obtained even when samples have ion mobility variances that are not known.

Figure 5:
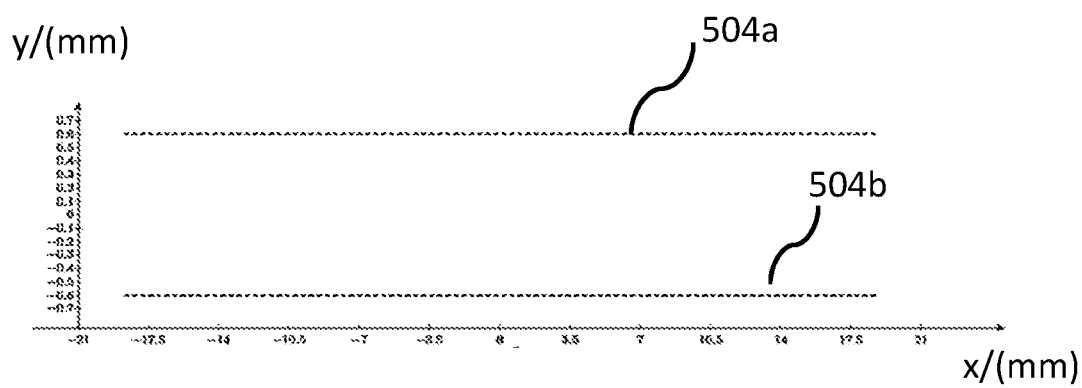
FIG. 5 shows an electrode arrangement according to a second embodiment.

Turning next to FIG. 5, there is depicted an electrode arrangement 504 according to a second embodiment, which is a specific implementation of the embodiment of FIG. 2 and which uses the principles illustrated in FIGS. 3 and 4. The electrode arrangement in FIG. 5 is shown in x-y section. In particular, FIG. 5 shows drift tube electrodes 504a and 504b in x-y section (y vs. x (mm)) with opposing electrodes shown at opposite +y and −y locations. Data derived from simulations performed using this embodiment and depictions of the voltages applied to the electrodes 504a and 504b are shown in FIGS. 6 to 14.

The drift tube of this embodiment is a planar construction, comprising strip electrodes 504a and 504b on two opposing substrates (which could be printed circuit boards). The electrode strips 504a and 504b are 200 µm wide (in the drift direction, x), with 200 µm gaps between strips (in the x direction). The two opposing plates are 1.20 mm apart (in the y direction). The electrodes 504a and 504b have lengths (in the z direction) of 19.0 mm that are in excess of 10 times the gap in the y direction between the substrates. The drift length (in the x direction) is 30.2 mm long and has 76 electrodes on each substrate. To avoid fringing field effects at the start and end of the drift tube, the tube has an extra length of 3 times the gap (i.e. 3.6 mm) added to each end, each of which includes 9 electrodes on each substrate, giving a total of 94 pairs of opposing electrodes. A first electric field component is created in the x direction as will be described below, and this first electric field component causes ions of an appropriate charge polarity to travel in the +x direction, which is denoted the drift direction.

The second electric field component in this embodiment is a sinusoidal waveform, which is symmetric and which is straightforward to produce. The second electric field component is applied along at least a part of path along the drift tube and is perpendicular to the drift tube axis (which lies in the x direction at y=0), with the resultant field being of such an intensity when combined with the first electric field component so as to cause the ions to undergo modification of their ion mobility. Thus, the time taken by the ions to traverse the drift tube will change, even though the sinusoidal waveform does not act in the drift direction (+x). In other words, the second electric field component applies a force to ions that is always substantially perpendicular to the direction of ion motion in the x direction, meaning that the second electric field component does substantially no work on the ions in the x direction yet still influences the component of the ions' velocity in the x direction by virtue of its influence on their mobility (which is a scalar quantity and which affects motion in all directions). The change in ion mobility at a given total E/N varies between different ion species.

All ion species undergo oscillations perpendicular to the axis of the drift tube under the influence of such a second electric field component. However, unlike in conventional FAIMS devices, no ion species gains any net perpendicular velocity. Furthermore, the second electric field component can be a sinusoidal waveform with time; an asymmetric waveform is not required by the present invention as it is in conventional FAIMS. If the frequency of the sinusoidal waveform is relatively high, then ion oscillation amplitudes will be considerably smaller than the width of the drift tube and all ions will be retained. The zero to peak oscillation amplitude for different ions at high pressure (close to atmospheric pressure) can be approximated by Equation (2), where $\mu$ is the ion mobility, $E_0$ the peak sinusoidal electric field strength, and $\omega$ is the angular frequency. Equation (2) is reasonably accurate at atmospheric pressure, but becomes less accurate at lower pressures. For instance, Equation (2) is reasonably accurate for the purpose of determining drift tube dimensions down to approximately atm/10 of air at room temperature. Equation (2) can be used to dimension a specific drift tube so as to be wide enough for ions not to strike the electrodes if it is known that the drift tube will be used for analysis of a certain type of sample.

$$s_p = \frac{\mu \cdot E_0}{\omega} \qquad \text{Equation (2)}$$

This embodiment has the advantage that the strip electrodes 504a and 504b that are utilised to provide the axial (first) field component may also be utilised to apply the transverse (second) field component. Time invariant (DC) voltages may be applied to the strip electrodes 504a and 504b using a simple voltage divider to produce the axial field component, each strip on the upper substrate having the same time-invariant voltage as is applied to the corresponding strip on the lower substrate. Time-varying voltages of one phase may be capacitively coupled to some or all the strip electrodes 504a of the upper substrate whilst applying the opposite phase to some or all electrodes 504b of the lower substrate.

Moreover, this embodiment is capable of providing a conventional DT-IMS when the sinusoidal voltage waveform is turned down or off, in addition to providing an enhanced ion mobility spectrum having orthogonal modes of IMS and DMS when a relatively high amplitude second electric field component is applied. Moreover, DMS without loss of ions can be provided by comparison of spectra taken with different amplitude sinusoidal voltage waveforms applied. In this way, data comprising an ion's time of flight versus voltage of the second (or total) electric field can be obtained and used to characterise or identify the ion species, e.g. by comparison to library data.

A drift tube comprising the parallel strip electrodes 504a and 504b according to this embodiment can be simulated using a boundary element method and the results of such simulations are depicted in FIGS. 6 to 17. The operation of the drift tube is simulated in air at atmospheric pressure (101325 Pa) and room temperature (293.15 K), treating air as a single molecule. It is to be understood that this embodiment is simulated in air at atmospheric pressure and room temperature for the purposes of simplicity. However, other gases and/or temperatures and/or pressures may be used. It is assumed in the simulation that space charge is negligible.

A time-invariant electric field component in the x direction is applied by the application of progressively more negative voltage to the 76 strip electrodes 504a and 504b on moving from −x to +x, with 0V set at x=0 (by convention). The voltage difference between adjacent strip electrodes is 40 V. The voltage on each strip of the upper substrate is at the same direct current (DC) potential as the corresponding opposing strip on the lower substrate. Equipotential planes of time-invariant potential are thereby formed perpendicular to the x-axis of the drift tube.

Ions are started at the x plane where the potential is +1500 V and stopped at a plane where the potential is −1500 V. Due to slight fringing field effects, the distance between these planes is 29.8 mm, and the constant electric field in the x direction is $1.01 \times 10^5$ V/m. Singly charged ions of mass 100 Da have a velocity of some 20 m/s in this field, which is still significantly below the speed of sound (~343 m/s). Accordingly, the conditions are such that E/N is modest and diffusion coefficients in longitudinal and transverse directions can be taken to be the same.

At low E/N fields, the longitudinal and transverse diffusion coefficients are approximately equal and are similar to the value predicted by the Einstein relation. At higher E/N, both longitudinal and transverse diffusion coefficients for many ions increase, and they may differ from one another, typically with the longitudinal coefficient exceeding the transverse. The diffusion coefficients are related to the ion mobility. At low E/N the mobility is often reported as a zero-field reduced mobility. At high E/N ion mobility is known to change and for some ions the mobility increases and for some ions it decreases. The diffusion coefficient for an ion can be calculated using the Einstein relation:

$$D = \frac{k_B \cdot T}{q} \cdot \mu \qquad \text{Equation (3)}$$

in which $k_B$ is the Boltzmann constant, T is the gas temperature, q the charge on the ion and μ the mobility of the ion. Transverse and longitudinal diffusion coefficients are equal in the low field (low E/N) regime considered here. Mobility can be estimated using the Mason-Schamp equation:

$$\mu = \frac{3}{16} \cdot \frac{q_{ion}}{P} \cdot \left(\frac{1}{\text{mass}_{ion}} + \frac{1}{\text{mass}_{gas}}\right)^{\frac{1}{2}} \cdot (2 \cdot \pi \cdot k_B \cdot T)^{\frac{1}{2}} \cdot \frac{1}{\pi \cdot \left(\frac{d_{ion}}{2} + \frac{d_{gas}}{2}\right)^2} \qquad \text{Equation (4)}$$

The ion mobility calculated using Equation (4) is $1.946 \times 10^4$ m²/V·s for ions of mass 100 Da and diameter $9.08 \times 10^{-10}$ m in air at room temperature and atmospheric pressure. The diffusion coefficient D is then $4.92 \times 10^{-6}$ m²/s. The full-width half maximum (FWHM) distance, $s_{fwhm}$, spreading due to diffusion in each of x, y and z directions is given by Equation (5).

$$s_{fwhm} = \sqrt{16 \cdot \ln(2) \cdot D \cdot t} \qquad \text{Equation (5)}$$

This FWHM distance spreading is expected to be 0.27 mm in each direction by the time the ions reach the detector plane. The spreading in the x direction affects the temporal width of the peak that is detected.

The drift velocity is a function of the mobility and the electric field strength, which is a function of the voltage drop along the tube. The diffusion is also a function of mobility, as shown by Equation (3). When this is considered, the resolving power is simply a function of the voltage drop across the drift tube in the case that the initial pulse of ions is sufficiently compact in the drift direction, regardless of the length of the tube and independent of the ion species. Where there is a linear voltage drop along the drift tube, the resolving power is given by Equation (6), where $V_{tube}$ is the voltage drop along the tube that the ion is experiences from start point to detector.

$$RP = \sqrt{\frac{q \cdot V_{tube}}{16 \cdot \ln(2) \cdot k_B \cdot T}} \qquad \text{Equation (6)}$$

Equation (6) gives a resolving power of 103.5 for singly charged ions of all mobilities.

As noted in relation to FIGS. 3 and 4, ions (and particularly molecular ions) have mobilities in gas that vary with electric field strength as their velocity approaches and exceeds the speed of sound in the gas. The enhancement of the separation provided by this embodiment relies on ions having a difference in their mobility variance as function of field strength and controlling the field strengths in the drift tube accordingly so as to exploit this difference. Different ions are known to have different variance of mobility with field strength, even if the functional form of this difference is not known or not known with precision. It is therefore advantageous to be able to vary the strength of the applied electric field during the acquisition of a set of ion mobility spectra, so as to be able to observe which peaks are split at different field strengths, thereby revealing at least two components that might otherwise be indivisible, and also to observe the degree of peak splitting as a function of field strength applied.

Whilst in the embodiments described herein, peak ion velocities are always below the speed of sound in the gas, this is for the purposes of simplifying the analysis. If the applied field strength is increased significantly, this might cause some ions to exceed the speed of sound in the gas and increased diffusion would then be likely to occur. This has conventionally been seen as a disadvantage and conventional drift tubes are therefore operated to avoid diffusion. Nevertheless, there may be an optimum field strength for a given sample, such that the enhanced peak splitting obtainable using a high field is balanced against peak broadening due to increased diffusion of the same or other ion species of interest.

Moreover, variation of the strength of the electric field also allows analysis of the axial diffusion coefficient, as any peak broadening can be observed as the field strength is increased. For instance, the peak width in time at the detector is the same for all ions as long as they all stay in the low field regime, as demonstrated by Equation (6). By applying an additional field component, some ions can be made to travel at velocities near or above the speed of sound in the gas, and this will make their diffusion coefficient increase. The peak width at the detector will increase, as shown in Equation (5) in which $s_{fwhm}$ is proportional to the square root of D. Thus, if the ion mobility is known (e.g. by measuring the time of detection in the drift tube), then Equation (5) can be used to determine D in the low field case. Watching the peak broaden as the second electric field component is increased allows the changes in D to be observed.

It will also be appreciated that in cases where the applied second electric field component is time-varying (for example oscillating), peak ion velocities might reach or exceed the speed of sound in the gas, but ions will only attain the peak velocity for a small proportion of the time-varying cycle. In such a situation, the diffusion coefficients (both transverse and longitudinal) will be varying over the cycle and any net peak broadening will be considerably less than would result from the ions undergoing a steady state high electric field of the same magnitude. The methods of this disclosure therefore allow relatively high fields to be used and allow the observation of large changes in ion mobility, whilst mitigating to some extent the negative effects caused by high diffusion in strong electric fields.

In any case, the more modest electric fields exemplified in this disclosure have little effect on the degree of diffusion and so the advantages of improved splitting of peaks tend to outweigh any effects due to diffusion. The electric field strengths may be chosen with care during use so as reduce or minimise any negative effects from diffusion. For example, an optimum field strength may be identified during operation. This could be performed by continuously varying operating parameters until acceptable peak splitting and peak widths are observed.

The electric field strength at which low mobility ions (e.g. higher mass ions) experience mobility variance is higher than that for high mobility ions (e.g. lower mass ions), because their velocities differ at a given field strength and the mobility variance is itself related to the ion velocity relative to the speed of sound in the gas. Therefore, whilst the resolving power of the ion mobility tube under the time-invariant (first) electric field component is the same for all masses (at least at the relatively low field strengths described herein), the degree of ion mobility variance for a given applied time-varying (second) electric field component will vary both according to the ion species and also as a function of ion mobility due to the ion's velocity induced by the applied electric field. In particular, the degree of enhancement of the resolving power also varies as a function of the ion species, due to ions having different molecular structures, as some molecules undergo deformations under high applied fields, which can lead to changes in ion mobility.

Obtaining a high enough degree of peak splitting for a low mobility species may require the application of a second electric field component of a high enough strength to cause high mobility species of ions in the same sample to reach or exceed the speed of sound in the gas. In this case, and as noted previously, the higher mobility ions are likely to diffuse more rapidly, possibly causing peak broadening. In such circumstances it is advantageous to take multiple spectra at different applied second electric field strengths. At a chosen lower second electric field strength, the diffusion of ions of all mobilities may be held at or near the low field value, whilst enhancement due to peak splitting may occur only for high mobility ions. Spectral information for these ions may be obtained. At a second electric field strength that is strong enough to produce enhancement by peak splitting of low mobility ions, the high mobility ions may experience significant peak broadening due to increased diffusion. However, spectral information on ions of low mobility can now be obtained. The combined spectral information under the effects of the low and the high second electric field strength can yield valuable information that would otherwise be unobtainable from a conventional drift tube.

In the simulations described herein, ion motion is calculated by solving Equation (7) numerically. Equation (7) is the equation of motion for ions within a gas and subject to an electric field. The solution to Equation (7) can be considered to be an 'average' ion trajectory, because Equation (7) does not take into account the effects of diffusion. Diffusion will cause ions to spread in all three degrees of freedom, but the average ion trajectory is described by the solution to Equation (7). Effects of diffusion are considered further below. In Equation (7) v(t) is the ion velocity, m is the mass, q is the charge, E(t) is the time-varying electric field and t(t) is the relaxation time of the ion in the gas, which is a function of time as it is dependent on the ion velocity, and therefore the field strength.

$$\frac{d}{dt}v(t) + \frac{v(t)}{\tau(t)} = \frac{q}{m} \cdot E(t) \qquad \text{Equation (7)}$$

The relaxation time is related to the ion's mobility, μ, by Equation (8) and mobility variance with ion velocity is as depicted in FIG. 4, for type C and type A ions. Equation (8) is valid under conditions where the ion velocity remains smaller than the Maxwellian average thermal velocity of the gas molecules, which is ~1.35 times the speed of sound in the gas, and such conditions prevail in the simulations presented herein.

$$\tau = \frac{m}{q} \cdot \mu \qquad \text{Equation (8)}$$

In these simulations, the zero-field reduced mobility for type A and type C ions is taken to be precisely the same for simplicity. As E/N rises and the ion velocity increases the mobilities for the two species change. The diffusion coefficients in longitudinal and transverse directions are also taken to be the same, as the field strength applied remains well below a value at which the ion velocity reaches the speed of sound in the gas (as discussed further below). Any differences between the longitudinal and transverse diffusion coefficients are dependent upon the precise ion species and the gas, and the approximation that the coefficients are the same at the moderate values of E/N used here is useful and justified. Whilst velocities approaching the speed of sound in the gas are not obtained in the simulations described in this disclosure, the general principles of operation of this disclosure can be extended to analysis of samples that do obtain such velocities.

In these simulations, type A and type C ions are sent along the drift tube. The difference between the arrival time of the two types of ion is less than 1 µs in ~1.3 ms, and the resolving power required to separate the two ions is ~1560, some 15 times the resolving power possessed by the drift tube of this embodiment when used in a conventional DT-IMS configuration. The resolving power of the drift tube derived from the arrival times of the ions in the ion optical simulation agrees with that predicted by Equation (6), being 103.5.

Simulated ion arrival spectra can be generated by utilising random numbers that follow a Gaussian probability distribution having standard deviation given by Equation (9).

$$\sigma = \sqrt{2 \cdot t \cdot D} \qquad \text{Equation (9)}$$

The low-field diffusion coefficient D is used. 10,000 ions of each type are generated in this way, with their mean value set equal to the arrival time found using the simulation.

Figure 6:
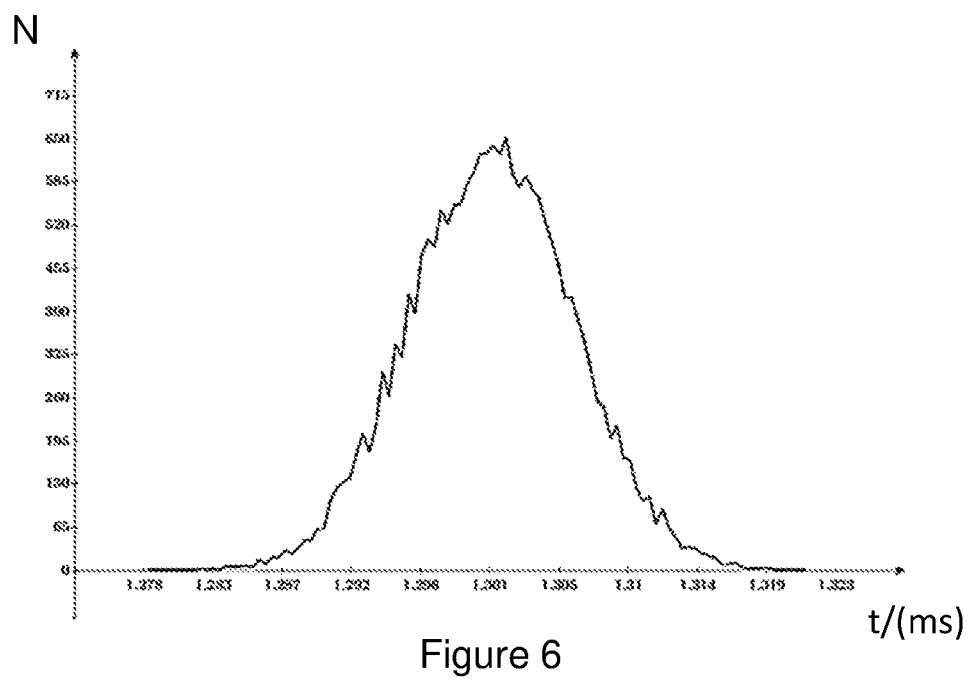
FIG. 6 shows a simulated time-of-flight spectrum for two types of ion in conventional DT-IMS.
Figure 7:
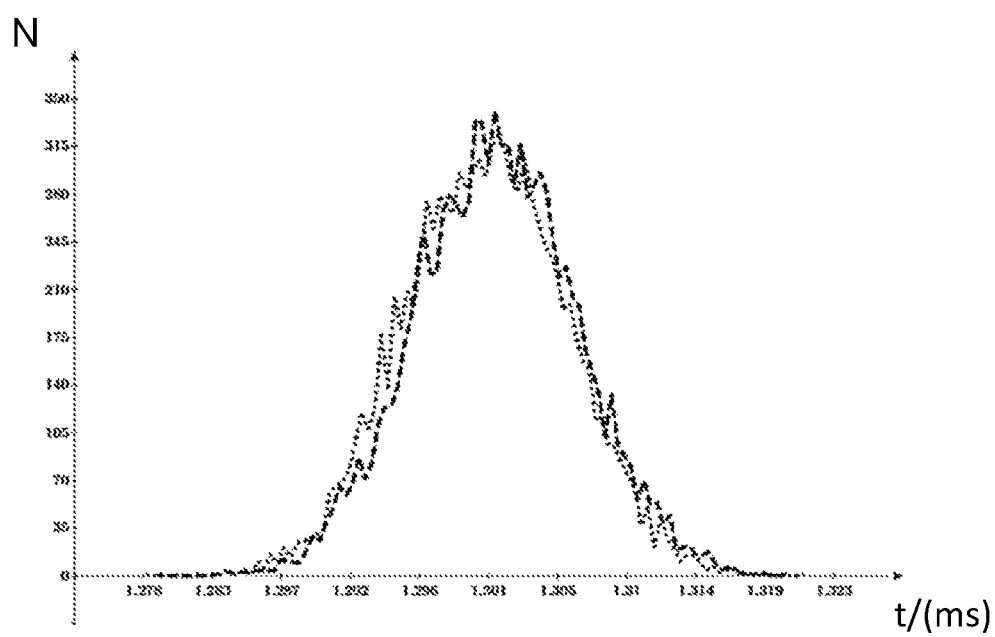
FIG. 7 shows the simulated time-of-flight spectrum of FIG. 6 decomposed into two individual spectra.

In FIGS. 6 and 7, resultant simulated time-of-flight spectra (number of ions vs. arrival time (ms)) are depicted for ions of mass 100 Da and diameter $9.08 \times 10^{-10}$ m in air at room temperature and atmospheric pressure. FIG. 6 depicts the total (i.e. summed) spectrum for the 20,000 ions of both types. FIG. 7 depicts the two distinct spectra, with the dashed trace being ions of simulated type C mobility variance, and the dotted trace being ions of simulated type A mobility variance.

It is clear from FIGS. 6 and 7 that the two types of ions cannot be separated by this drift tube in a conventional DT-IMS arrangement. To obtain the 1500 resolving power necessary to resolve these peaks, Equation (6) indicates that a voltage drop across a drift tube of >0.6 MV would be required. Such voltages require high electrical power and cause high rates of diffusion.

The second embodiment of the present disclosure is directed to addressing these deficiencies in DT-IMS. The second embodiment recognises that applying a sinusoidal voltage waveform of amplitude 400 V (zero to peak) between the strip electrodes (504a and 504b of FIG. 5) on one substrate and strip electrodes on the opposing substrate produces a transverse electric field component, and allows the two types of ion to be well resolved. In a first case the frequency of the waveform is 1 MHz, and the ions oscillate with a maximum of 28 µm amplitude (zero to peak), which is well within the dimensions of this particular drift tube.

The sinusoidal voltage is applied to the central 64 strip electrodes on both the upper 504a and the lower 504b substrates.

Figure 8:
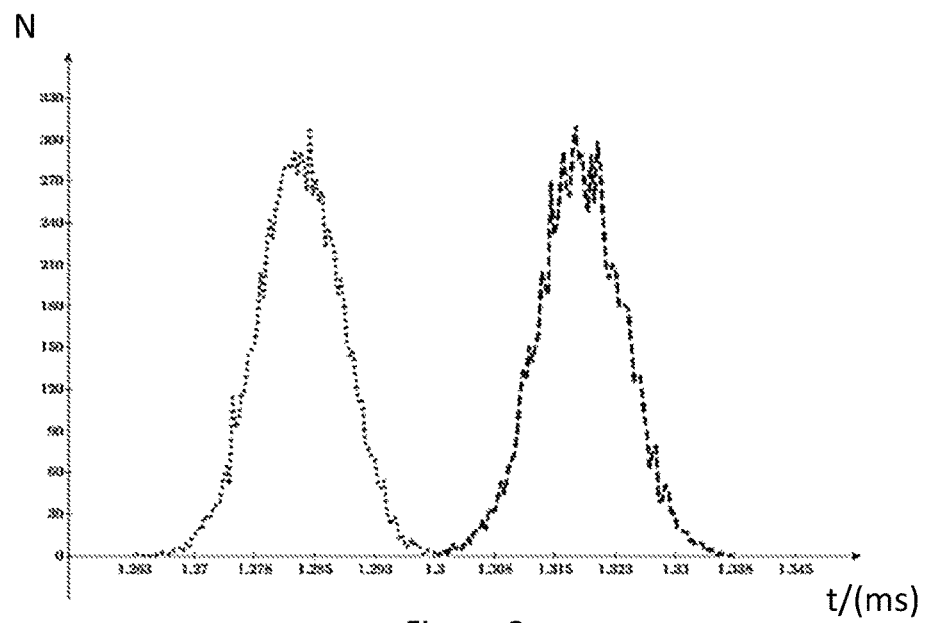
FIG. 8 shows a simulated time-of-flight spectrum for ions corresponding to those analysed in FIGS. 6 and 7 when analysed using the second embodiment.

Turning next to FIG. 8, the results of providing a drift tube in accordance with the second embodiment are depicted. FIG. 8 shows the resultant simulated time-of-flight spectrum for ions corresponding to those analysed in FIGS. 6 and 7. In particular, FIG. 8 depicts simulated time-of-flight spectrum (number of ions vs. arrival time (ms)) for 20,000 ions of mass 100 Da and diameter $9.08 \times 10^{-10}$ m in air at room temperature and atmospheric pressure using a second electric field component having a 400 V RF amplitude and a frequency of 1 MHz. The dashed trace shows simulated type C mobility variance and the dotted trace shows simulated type A mobility variance. It can be seen that the type A ions, which increase in mobility as the applied field strength increases, arrive before type C ions, which decrease in mobility as the applied field strength increases.

Type B ions will exhibit behaviour similar to that of type A ions at a first field strength, and at that field strength can be separated from type C ions in a similar way. On increasing the field strength, their behaviour will change, and at a certain field strength their net mobility will be similar to that at a low field. At this field strength, type B ions will exhibit a degree of separation from both type A and type C ions. At a still higher field strength, type B ions will exhibit behaviour similar to that of type C ions and may be easily distinguished from type A ions. This illustrates how multiple spectra each taken on a portion of the same sample but with different field strengths can reveal additional information.

It is apparent from FIG. 8 that the arrival times of the two types of ion are separated well by the application of the transverse second electric field component. As the average time for both ions to traverse the drift tube is very similar, and not significantly different from a case in which no transverse electric field component is applied, time-of-flight spectra can be taken with much the same speed as the unresolvable peaks shown in FIG. 7.

The strength of the transverse field component is 800 V across 1.2 mm, which is $6.67 \times 10^5$ V/m. This only takes the ions' maximum transverse velocity to a peak of 150 m/s, which whilst being a substantial fraction (i.e. greater than 10%) of the speed of sound is sufficiently below the speed of sound in the gas (and hence in a regime where deleterious effects from diffusion are not significant), yet the relatively modest variation in mobilities obtained at such field strengths (which can be seen in FIG. 4) over much of the length of the drift tube is capable of changing the ion flight times by such an extent that the two types of ion are readily resolved. The two peaks now only require a resolving power of 37 to separate them at their FWHM. As already noted, the transverse sinusoidal voltage is only applied to the central 64 electrodes, with the ions travelling across 76 electrodes. The ions therefore start in an almost completely undisturbed region having little transverse field strength, and also reach a detector plane having similarly little transverse field strength.

Figure 9:
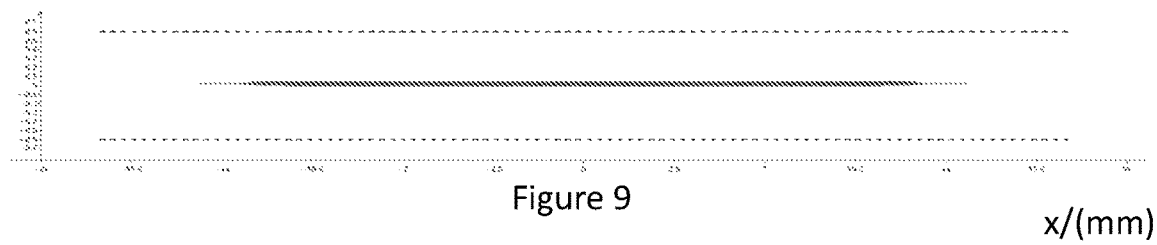
FIG. 9 shows the trajectories of the ions of FIG. 8.

The ion trajectories of this embodiment are depicted in FIG. 9, in which the trajectories of two ions (which cannot be distinguished on this scale) are plotted as y (mm) vs. x (mm). This figure shows the relatively small oscillation amplitude in the y direction at 1 MHz, and that there is no net movement in the y direction (i.e. towards one of electrodes 504a and 504b) as ions move along the length of the drift tube. In this case, the trajectories of the ions are generally transverse oscillations about the path (with the path being the axis of the drift tube).

Equation (3) indicates that diffusion is proportional to mobility. This equation is only valid for ion speeds significantly slower than the speed of sound in the gas. It is known that diffusion rises at higher ion velocities. However, rising longitudinal and transverse diffusion coefficients (which usually differ) are generally observed at ion velocities above the speed of sound in the gas. As discussed previously, in this embodiment, the ion velocity is still well below the speed of sound in the gas, so the very modest increase in electric field strength does not negatively affect the resolving power of the drift tube.

The application of the sinusoidal waveform of this embodiment provides separation of ions that is analogous to FAIMS separation, without significant loss in resolving power to the ion mobility spectrum. The degree of separation can be set electronically and can be varied for successive spectra. The separation provides separation in flight time rather than in transverse position (and hence ions are not neutralised by the electrodes 504a and 504b).

Figure 10:
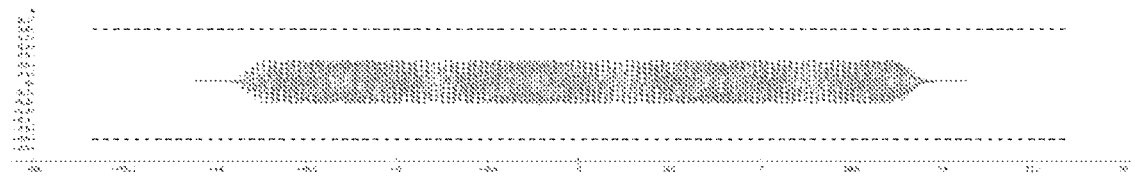
FIG. 10 shows the trajectories of ions analysed using a third embodiment.

In FIG. 10, the results of a simulation of a third embodiment are depicted. The third embodiment is similar to the second embodiment and utilises the same electrodes 504a and 504b as depicted in FIG. 5. However, the third embodiment provides a 400 V RF sinusoidal second electric field component having frequency of 100 kHz. FIG. 10 specifically depicts trajectories of two ions, which cannot be distinguished from each other on the scale shown, as y (mm) vs. x (mm). The oscillation amplitude (zero to peak) is 240 μm, which is much greater than in the second embodiment, but still significantly below the spacing between the electrodes 504a and 504b. It can therefore be seen that the oscillation amplitude in the y direction increases when a 100 kHz frequency is used, although again there is no net movement in the y direction as the ions move in the x direction.

As noted previously, Equation (2) becomes less accurate at lower pressures. However, a comparison of the simulations of the second embodiment and this embodiment demonstrates that adjusting the frequency of the applied electric field component can provide a significant degree of control over oscillation amplitude. Thus, it can be seen when lower pressures are used, the methods and apparatus of this disclosure can still be used advantageously and straightforwardly by adjusting the amplitude and/or increasing the frequency of the applied second electric field component so as to ensure that the magnitude of ions' oscillations remains within the dimensions of the drift tube.

Figure 11:
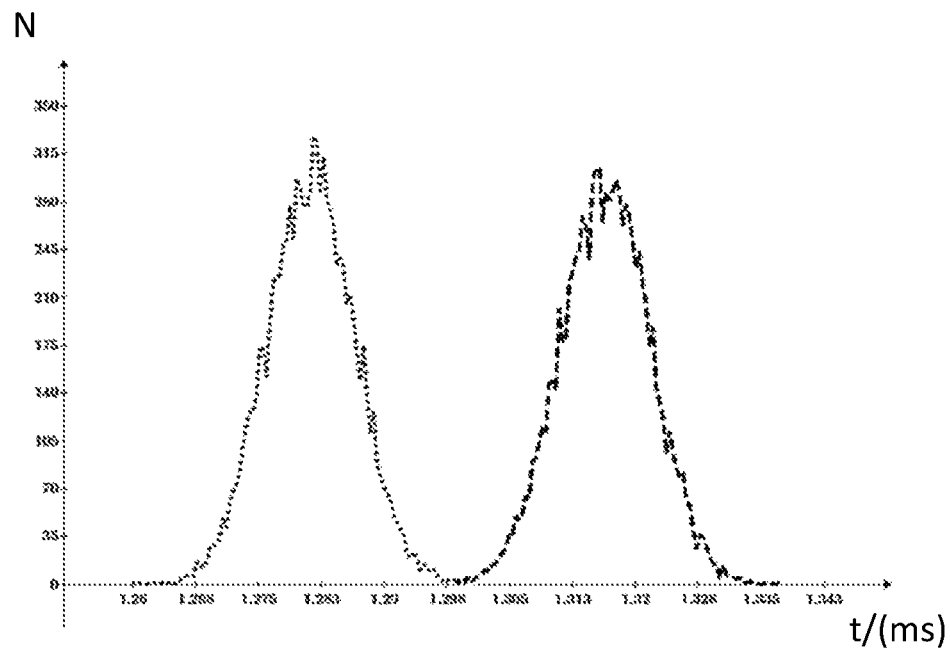
FIG. 11 shows a simulated time-of-flight spectrum for the third embodiment.

In FIG. 11, a simulated time-of-flight spectrum (showing number of ions vs. arrival time (ms)) is shown for the third embodiment for a sample of 20,000 ions of mass 100 Da and diameter $9.08\times10^{-10}$ m in air at room temperature and atmospheric pressure. The dashed trace shows the number of arriving ions of type C mobility variance and the dotted trace shows the number of arriving ions of type A mobility variance. It can be seen from FIG. 11 that the change in transverse frequency (from 100 MHz in the second embodiment to 100 kHz in this embodiment) does not negatively affect the time of flight spectrum, with the two types of ion being separated to substantially the same degree as in FIG. 8.

Hence, it can be seen from the second and third embodiments that applying a second electric field component perpendicular to a first (drift) electric field component provides improved separation of ions. The simulations demonstrate this for a particular ion mobility variance function applied to ions of mass 100 Da, in one form to produce simulated type C mobility variance, and in an inverse form to produce simulated type A variance. As noted above, this simulated behaviour can be derived using just two terms in Equation (1) where $\alpha_2$ is $-5\times10^{-5}$ and the $\alpha_4$ is $5\times10^{-9}$ for type C behaviour, mass 100 Da, and these coefficients are multiplied by −1 for ions of type A behaviour mass 100 Da. All higher order α terms may be set to zero. Whilst simplifying assumptions are made for the second and third embodiments, the same principles can be extended to analysis of other samples.

To that end, a fourth embodiment is provided using data for molecular ions given in Prasad et. al. Anal. Chem. (2009), 81, 8749-8757, Table 1. This provides values for 2-propanone (dimer), which has a mass 116.16 amu, of a low field mobility of $1.85\times10^{-4}$ $m^2 \cdot V^{-1} \cdot s^{-1}$, $\alpha_2$ of $7.44\times10^{-6}$ $Td^{-2}$ and $\alpha_4$ of $-6.94\times10^{-10}$ $Td^{-4}$. 2-propanone (dimer) is of type A mobility variance (over the E/N ranges considered in this disclosure). Again, a simulated type C ion can be created using the same low field mobility and, $\alpha_2$ and at terms multiplied by −1. The mobility variance of this ion is notably less pronounced than in the second and third embodiments above, but this is offset by the use of a larger time-varying electric field strength to fully separate the type A and type C ions. The second field strength is multiplied by a factor 1/0.4 (i.e. 2.5), the peak time-varying transverse voltage being 1000 V (compared with 400V in the second and third embodiments), with the frequency being 1 MHz.

The strip electrode 504 geometry of planar opposing substrates is again used in this embodiment, as described in relation to FIG. 5, and the same time-invariant first electric field component is applied. Two representative ions are simulated, both of mass 116.16 Da, starting at ½0th of the distance from the axis to the upper strip 504a electrodes, one ion being of type C and one being of type A mobility variance.

Figure 12:
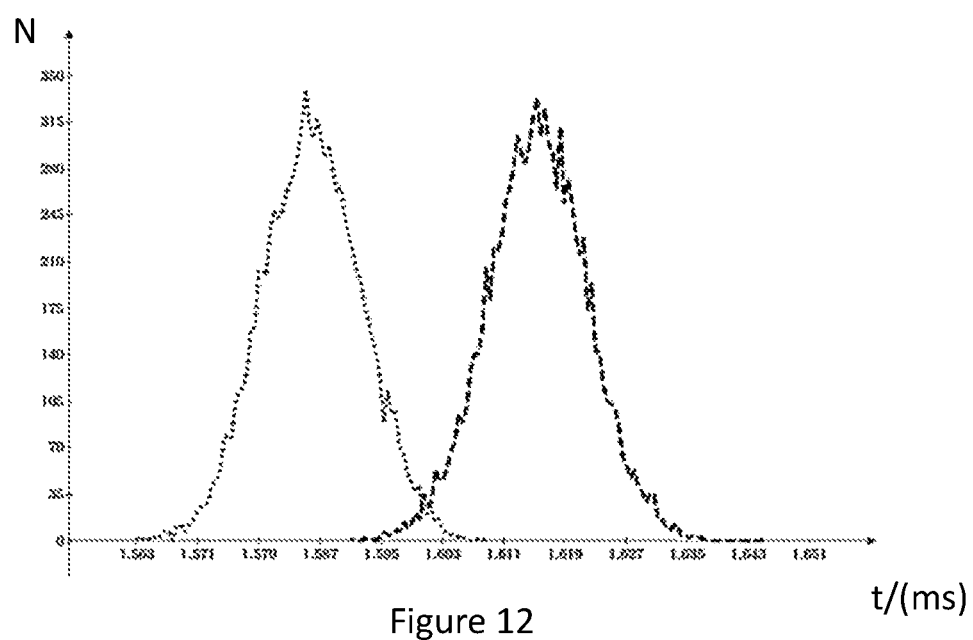
FIG. 12 shows a time-of-flight spectrum resulting from analysis using a fourth embodiment.

FIG. 12 is a plot of the resultant time-of-flight spectrum resulting from analysis using the fourth embodiment, from which it can be seen that types A and C ions for 2-propanone (dimer) can be clearly resolved. The time-of-flight spectrum shows the number of ions vs. arrival time (ms) for 20,000 ions of mass 116.16 Da and diameter $9.331\times10^{-10}$ m in air at room temperature and atmospheric pressure using this embodiment. The dashed trace depicts the arrival times of the type C and the dotted trace depicts the arrival times of the type A ions.

The transverse field strength is higher in this case than in the embodiment described in relation to FIGS. 8 and 11, with the peak transverse field strength being $1.59\times10^6$ V/m, giving a peak transverse velocity of 301 m/s, and a root-mean square (RMS) transverse velocity of 201 m/s. Both of these velocities are below the speed of sound in the gas but are a substantial fraction of the speed of sound. Using a stronger field in this case leads to peaks that are well separated for analysis of 2-propanone (dimer).

Thus, it can be seen that the second, third and fourth embodiments each provide numerous advantages and the ability to resolve IMS peaks in a variety of scenarios. This is true when parameters that are similar to (or at least on the order of) those of real species are used in the simulations of this disclosure. An advantage that is common to the described embodiments is that unlike conventional FAIMS or DMS, these embodiments do not act as a bandpass filter in which only a small range of ions is transmitted with the remaining ions being discarded. Instead, the embodiments of this disclosure provide methods and apparatus that are capable of retaining all ion species (of a chosen polarity of charge state) and transmitting them on to a detector or to additional devices, such as a mass spectrometer. Apart from affecting the amplitude of the ion oscillations, the frequency has little effect.

Hence, returning to the generalised terms used previously, the present disclosure provides a method of separating a sample of ions according to their ion mobilities as described previously, wherein the second electric field component comprises a transverse part of the total electric field applied for at least a part of the length of the path, the transverse part being perpendicular to the path. In other words, the overall electric field within the drift tube may be composed of first and second components that together superimpose. The second electric field component can then itself be considered to comprise a transverse part that is directed perpendicular to the path. The use of a transverse part provides the advantage of ensuring that for at least a part of the path length, the sample of ions is caused to move perpendicularly to the path, in such a way as to modify the mobilities of the individual ions, without having a net perpendicular movement.

In the case of a straight path within the drift tube (e.g. a path parallel to the longitudinal drift tube axis), the transverse part is perpendicular to the direction of the drift tube axis and the direction of the path. In the case of a curved drift tube, the path may also be curved, in which case the transverse part will be perpendicular to the path along its length. In other words, the transverse part may be locally perpendicular to the path (along some or all of its length). A second electric field component provided in any arbitrary direction within three-dimensional space can be resolved into components, with one component being taken to be perpendicular to the path and another component being directed along the path. Hence, any arbitrarily-directed electric field component can be resolved into a transverse part which may be taken to be the projection of the electric field component in the transverse direction. Similarly, a longitudinal part may be taken to be the projection of the electric field component in the direction of the path.

In the present invention, the time taken for the ions to reach the end of the drift tube is modified even though the drift direction is perpendicular to the sinusoidal electric field component. The modification is not a function of the ions' mobility but is a function of their differential ion mobility. Using the embodiments described herein, ions that are indistinguishable in DT-IMS are separated if they have different differential ion mobilities. The degree of separation depends upon the magnitude of the difference in the differential ion mobility.

The transverse part is preferably directed in a first direction that is perpendicular to the path during a first time period, and subsequently directed in a second direction that is opposite the first direction during a second time period. Thus, ions are driven away from the path during the first time period (i.e. towards one edge of the drift tube or one electrode), before being driven in the opposite direction (i.e. away from the edge or electrode) during the second time period, thereby preventing the ions from striking the walls or deviating significantly from the path (on average). Some methods of the present disclosure preferably comprise repeatedly alternating the direction of the transverse part. Therefore, ions may be caused to oscillate towards and away from the path. Such an alternating direction field may be provided by sinusoidal variations or by other forms, as discussed in greater detail below. The frequency at which the direction of the transverse part reverses may be selected so as to ensure that ions do not deviate far enough from the path to strike the drift tube walls or electrodes.

For instance, in generalised terms, applying a symmetric second electric field component may modify the ion mobility of at least a portion of the sample of ions and cause at least a portion of the sample of ions to oscillate about the path of (which could be, for example, an axis within) the drift tube, thereby separating (or increasing the separation of) at least a portion of the sample of ions.

The transverse part is preferably a symmetric time-varying electric field component. This differs substantially (both in terms of the device operation and also in terms of the effect on ions) from FAIMS devices, which use asymmetric waveforms that alternate between a higher voltage of one polarity and a lower field voltage having the opposite polarity, with the lower field portion of the wave being applied for a longer portion of a wave cycle than the higher field portion. In the present disclosure, the use of a time-varying electric field component can cause ions to deviate from the path as they move along the drift tube, with the symmetric of the electric field component ensuring that the ions are not lost to walls of the drift tube. Due to the symmetric and time-varying nature of the electric field component, the ions repeatedly move towards and away from the path, providing an increased path length and increased separation whilst not striking the electrodes or walls of the drift tube. An electric field component may be considered to be symmetric if ions gain no net transverse velocity under the influence of the field component. This may arise due to the electric field component having substantially equal magnitudes for substantially the same duration of time in successive half-cycles, with the only difference being the direction of the applied forces (or the polarity of the voltages applied to electrodes) in successive half-cycles.

The transverse part preferably varies according to: a sinusoidal waveform; a square waveform; a rounded square waveform; a triangular waveform; and/or a rounded triangular waveform. For instance, a superposition of a sinusoidal and a square waveform could be employed to advantageous effect. Moreover, a rounded or approximated square wave waveform could be used to provide the advantages of increased ion separation due to enhanced ion mobility. As is known from Fourier analysis, a square wave (and indeed most arbitrary waveforms) may be approximated using a series of sinusoids. Thus, various waveforms may be employed in combination, including a superposition of a large number of time-varying electric field components. The transverse part can have any waveform provided the combined field strength of the first and second field components is high enough to modify the mobility of at least some ions for at least part of the time whilst the ions are in the drift tube, whilst not causing the ions to gain a substantial net velocity perpendicular to the path. The transverse part may vary according to a waveform by: the electric field having such a waveform; or the voltages applied to electrodes having such a waveform.

The transverse part preferably varies with a frequency of from 10 kHz to 100 MHz, preferably from 25 kHz to 10 MHz, preferably from 50 kHz to 5 MHz, and more preferably from 100 kHz to 1 MHz. The frequency can be used to control the amplitude of ions' oscillations, which can be used to ensure that ions do not strike the walls of the drift tube. Applying the second electric field component preferably causes the sample of ions to move away from the path by less than a transverse dimension of the drift tube. The transverse dimension may be the shortest perpendicular distance from the path to an interior surface of the drift tube or electrodes. In the case of a cylindrical drift tube in which the path is the axis of the cylindrical drift tube, the transverse dimension would therefore be the drift tube radius. Nevertheless, other geometries can be employed, as noted previously. The transverse motion of the ions can be controlled readily using the methods and apparatus of the disclosure.

In some cases, the transverse part may be time-invariant and symmetric for at least a part of the length of the path. For example, an electric field component within the drift tube could be a time-invariant but symmetric waveform (e.g. a square wave) for a portion of the drift tube length. As an example, the first 5% of the length of the drift tube may have a field that applies a constant transverse force to the ions, and then the next 5% (i.e. from 5% to 10% of the drift tube length) of the drift tube may have a field that applies an equal transverse force in the opposite direction. This pattern could repeat along the drift tube (e.g. with the direction of the time-invariant force alternating in space). Hence, the second field component within the drift tube could be represented (in terms of position in the drift tube) by a square wave. This type of symmetric electric field would not cause ions to gain any net transverse velocity, but would cause ions to move away from and then back towards the drift tube. This may be useful for providing high enough fields within the drift tube to cause mobility variations. Other portions of the length of the drift tube may have a time-varying second field component.

It will be understood that Equation (2) provides constraints on the dimensions of an apparatus for separating ions. Hence, the apparatus of the present disclosure may be for separating ions having a mobility p and may have a transverse spacing D of the electrode arrangement and/or the drift tube that is given by:

$$D \geq \frac{2\mu \cdot E_0}{\omega} \qquad \text{Equation (10)}$$

In Equation (10), $E_0$ is a peak electric field strength transverse to the path of the ions and w is a frequency of an electric field generated by the electrode arrangement.

Whilst it is most preferred that no ions strike the walls of the drift tube, it will be appreciated that a small number of ions being lost to the drift tube walls and/or electrodes is still advantageous with respect to prior FAIMS type devices (which deliberately discard a substantial fraction of an ion sample). If a large oscillation amplitude is induced (e.g. such that ions oscillate transversely to relatively close to the edge of the drift tube) and a high electric field is used (e.g. causing diffusion), then it will be appreciated that a small number of ions may be neutralised and lost. Nevertheless, it is possible using the methods of the present disclosure to retain substantially all ions or at least the vast majority of ions which have been injected into the drift tube (for example, more than 50%, 75%, 90%, 95% or even 99% of ions), giving significantly higher throughput and efficiency than FAIMS devices and improved separation relative to conventional DT-IMS.

The differences in ion mobility that the methods and apparatus disclosed herein provide can be substantial. The ion mobility may be changed by several tens of percent by the application of such a sinusoidal electric field component. For example, some ions may have their mobility reduced by 20% whilst others may have their mobilities increased by as much as 30%, for example. Therefore, very different spectra can be generated, leading to an enhanced ability to resolve ion species in a drift tube. However, more modest changes to the mobility of the ions are also capable of separating ion peaks so that the relatively low DT-IMS resolving power can distinguish them, as will be further described.

The second, third and fourth embodiments relate to methods and apparatus in which the direction of the first electric field component is parallel to the path (which is the drift tube axis) and is perpendicular to the direction of the second electric field component (which is sinusoidal electric field component in the previously described embodiments). However, in a fifth embodiment, the directions of the first and second electric field components are collinear or parallel for at least a part of the path. The fifth embodiment is a specific case of the first embodiment and the method depicted in FIG. 1, and can also be implemented using the apparatus depicted in FIGS. 2 and 5.

As noted previously, conventional ion mobility drift tubes have voltage gradients along the length of the tube that are time-invariant and relatively low in strength. This may be termed the conventional voltage arrangement. Ions in gas at high pressure cease to move if the electric field falls to zero, absent any gas flow. By rearranging the voltage gradient along the length of the drift tube, so that for at least a part of the length of the path, E/N exceeds the critical limit at which ion mobility variance starts to occur (but at no point does the axial field reach zero), the ion mobility for a portion of the time can be changed compared to the conventional voltage arrangement. DC voltages, which are time-invariant over the time period it takes for the ions to pass along the tube, can be applied to the tube. The resultant spectrum will differ from that recorded when the conventional voltage arrangement is applied.

A drift tube comprising parallel strip electrodes 504a and 504b as described in in relation to and depicted in FIG. 5 is used in the fifth embodiment. Again, the operation of the drift tube is simulated in air at atmospheric pressure (101325 Pa) and room temperature (293.15 K). A similar time-invariant potential drop is applied across the length of the drift tube as in the second to fourth embodiments, and an ion mobility resolving power of approximately 100 is expected given the diffusion predicted by Equation (6). Ion motion is again calculated using Equations (7) and (8).

Figure 13:
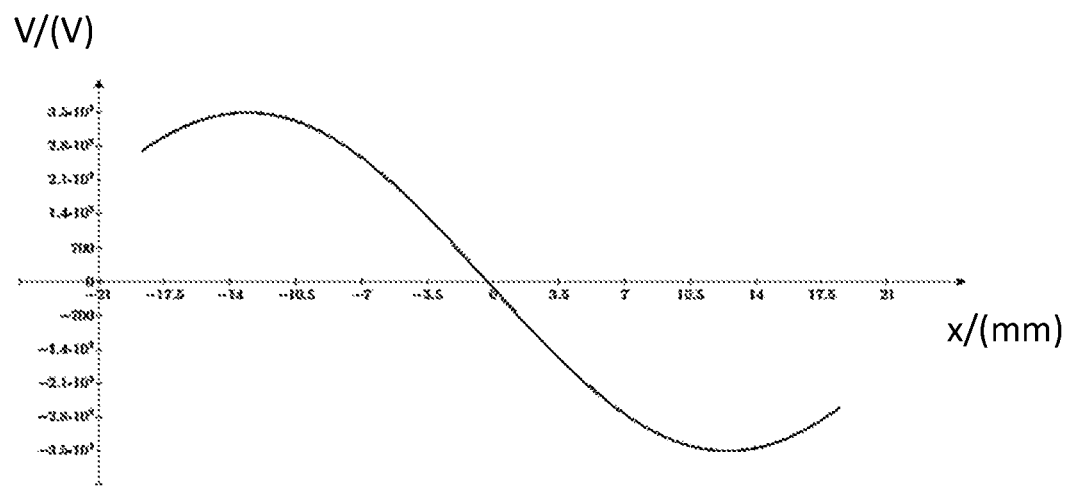
FIG. 13 shows a voltage waveform applied to electrodes in a fifth embodiment.

In this embodiment, a longitudinal (axial) time-varying electric field is applied to the drift tube, with the longitudinal time-varying electric field being composed of two electric field components. A first time-invariant field component is produced by applying a constant potential difference between adjacent electrodes of −40 V (from the start of the drift tube towards the detector). A second electric field component is a superimposed time-varying potential that varies sinusoidally in time, and which has a zero-to-peak voltage that is distributed across the electrodes from source to detector as a cosine function, as shown in FIG. 13. One peak of the cosine function is applied at the starting point of the ion trajectories (e.g. at the inlet of the drift tube or near ion source) and the other peak of the cosine is applied at the detector plane (typically positioned at an outlet of the drift tube). The way in which this cosine function superimposes with the axial field ensures that the longitudinal electric field component from the RF voltage is small at the source and detector regions. Advantageously, the time-varying field component is thereby minimised in the vicinity of both the source and the detector so as not to interfere with beam pulsing or ion detection.

FIG. 13 is a plot of the time-varying zero-to-peak voltage distribution as a function of axial distance along the drift tube for the time 0.25/f. Specifically, FIG. 13 shows the time-varying voltage distribution (V) vs. axial distance along the drift tube (mm) at a time when the sinusoidal time-varying waveform is at its positive peak. The zero-to-peak voltage applied in the time-varying waveform is 3500 V. This approach allows a large voltage to be applied along the length of the tube without developing a voltage between adjacent electrodes of magnitude that would cause electrical breakdown. An alternative method would be to apply the voltage linearly. Other functions for distributing the voltage can be used. In this embodiment, the frequency of the field is 1 MHz, although other frequencies can be used.

The axial field produced by this method is highly uniform over the transverse extent of the drift tube (i.e. perpendicular to the path), ensuring that ions that start off-axis or spread in the transverse direction experience substantially the same electric field as ions moving along the axis. Thus, ions that diffuse transversely are not preferentially biased towards the electrodes 504a and 504b, which ensures very little peak spreading in time occurs. Under the influence of the electric field of this embodiment, the axial velocity of ions reaches a substantial fraction of the speed of sound but remains below the speed of sound in the gas, being only a maximum of 122 m/s for 100 Da ions.

Four classes of ion are simulated for this embodiment, all of mass 100 Da. Two ions are started at ½₀th of the distance from the drift tube axis to the upper strip electrodes 504a, with one being of type C mobility variance and one being of type A mobility variance. A further two ions are started at half the distance from the axis to the upper strip electrodes 504a, again with one being of type C and one being of type A mobility variance. These initial conditions test the uniformity of the longitudinal field across half the width of the drift tube.

Figure 14:
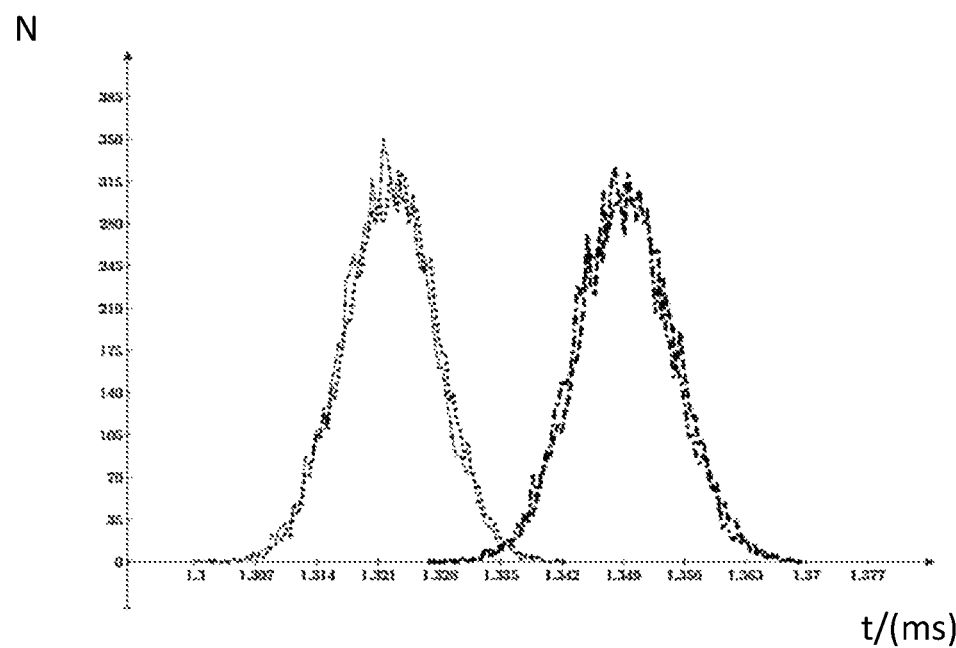
FIG. 14 shows the resultant time-of-flight spectrum for the fifth embodiment.

In FIG. 14, the resultant time-of-flight spectrum (number of ions vs. arrival time (ms)) is depicted for 40,000 ions of mass 100 Da and diameter $9.08 \times 10^{-10}$ m, in air at room temperature and atmospheric pressure. The simulation of FIG. 14 uses a 3500 V RF amplitude oscillating at 1 MHz applied longitudinally (i.e. along the direction of the path).

The two peaks at the left of the spectrum are the ions of type A mobility variance which increase in mobility under the applied field and hence arrive at the detector more quickly. The two peaks in bold to the right of the spectrum are the ions of type C mobility variance. Therefore, it can be seen that type A and type C mobility variance ions can be resolved readily. Type A ions arrive at the detector at approximately the same time (1.321 ms) regardless of the initial distance from the axis. Similarly, the type C ions arrive at the detector at approximately the same time (1.349 ms) regardless of the initial distance from the axis. Therefore, the applied RF voltage waveform is demonstrated to be acceptably uniform across the central half of the drift tube. A comparison of FIG. 14 with the spectrum of FIG. 7, which represents the ion mobility spectrum for the drift tube in the absence of the second applied time-varying field component, shows the benefits of this embodiment. In FIG. 7, the two types of ions cannot be separated by this drift tube in the absence of the time-varying field component, whereas this embodiment facilitates separation of type A and type C ions.

Figure 15:
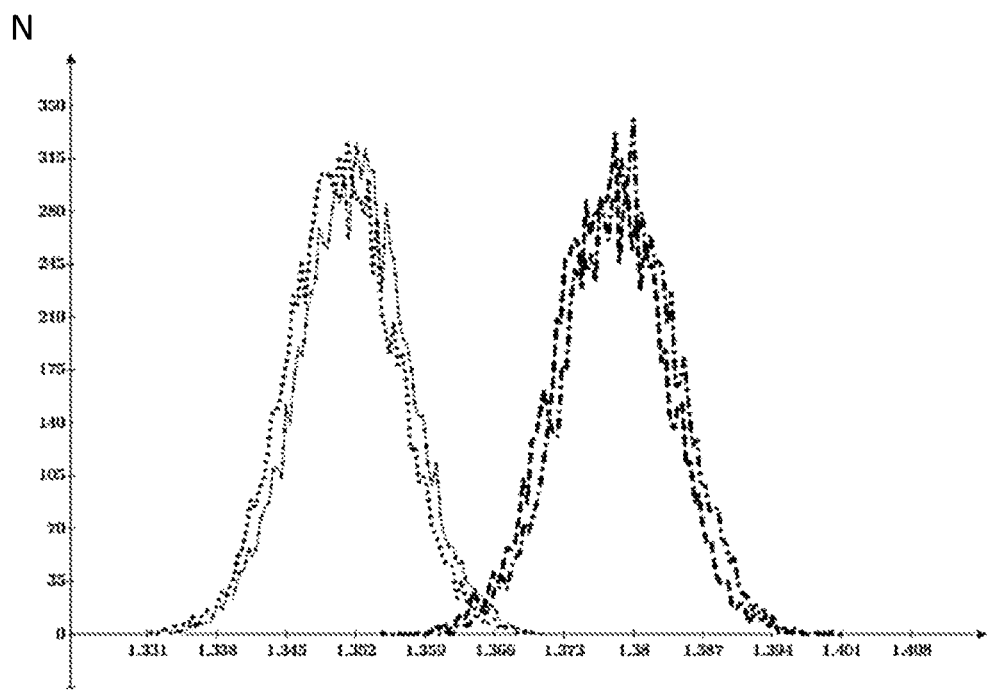
FIG. 15 shows a simulated time-of-flight spectrum for a sixth embodiment having a cylindrical drift tube comprising ring electrodes.

The second to fifth embodiments utilise parallel planar substrate electrodes as previously described. However, a cylindrical drift tube is used in a sixth embodiment. FIG. 15 shows the simulated time-of-flight spectrum from a cylindrical drift tube comprising ring electrodes. The ring electrodes are similar in arrangement to the strip electrodes of the parallel planar substrate depicted in FIG. 5, being 200 μm wide, with gaps between electrodes of 200 μm, the radius of the rings is 600 μm. There are a total of 94 ring electrodes.

The ions travel over a drift length equal to the distance of the central 76 electrodes. The electrodes have 3000 V time-invariant voltage applied across the central 76 electrodes, and 3711 V across the full 94 ring electrodes. The resolving power expected for this drift tube is again 103.5. The same time-varying voltage waveform as described in relation to the fifth embodiment is used, having the voltage distribution with axial position shown in FIG. 13.

In this embodiment, the longitudinal second electric field component may be provided by time-invariant voltages applied to the ring electrodes. A time-varying electric field within the drift tube can be established by controlling the voltages applied to the different rings of the electrode arrangement. The sizes and dimensions of the ring electrodes, as well as the voltages applied, can be chosen to minimise the variation in axial field produced as a function of distance from the axis.

FIG. 15 shows a time-of-flight spectrum (number of ions vs. arrival time (ms)) for 40,000 ions of mass 100 Da and diameter $9.08 \times 10^{-10}$ m in air at room temperature and atmospheric pressure using the sixth embodiment with a 3500 V (zero to peak) RF amplitude and a frequency of 1 MHz longitudinal electric field component. The bold traces show arrival times of simulated type C mobility variance ions and the other traces show simulated arrival times of type A mobility variance ions. In this embodiment, the axial velocity of ions again reaches a substantial fraction of the speed of sound but remains below the speed of sound in the gas, being only a maximum of 122 m/s for 100 Da ions.

Similarly to FIG. 14, four classes of ions are simulated. Type A and type C ions are started at a point that is ½₀th of the radius of the drift tube away from the drift tube axis. Moreover, type A and type C ions are started at ½ the radius of the drift tube from the drift tube axis. This again tests the uniformity of the longitudinal field across half the width of the flight tube. FIG. 15 shows the resultant simulated time-of-flight spectrum. The two peaks at the left of the spectrum are the ions of type A mobility variance. The two peaks to the right of the spectrum are the ions of type C mobility variance. Type A and type C mobility variance ions can be clearly separated. Ions that start near the axis and ions that start at half the tube radius from the axis are closely similar in terms of their arrival times for type C (approximately 1.38 ms) and for type A (approximately 1.346 ms) ions. This demonstrates that the applied RF voltage waveform is again acceptably uniform across the central half-radius of the drift tube in the case of ring electrodes.

In the fifth and sixth embodiments, a 1 MHz time-varying potential is used. However, other frequencies may be utilised. The apparatus of these embodiments is less sensitive to the oscillation amplitude (compared to a transverse electric field component) because the drift tube has a greater extent in the longitudinal direction than the transverse direction. Moreover, the cosine amplitude waveform as a function of axial distance (depicted in FIG. 13) advantageously reduces oscillation amplitudes in both the source and detector regions, which aids detection and limits the impact on beam pulsing. Therefore, these embodiments provide the advantages of a greater degree of flexibility in selecting operating parameters (e.g. amplitude and frequency) for the field components.

The fifth and sixth embodiments demonstrate the utility of a longitudinal second electric field component for a particular ion mobility variance function applied to ions of mass 100 Da, in one form to produce simulated type C mobility variance, and in an inverse form to produce simulated type A variance. As noted previously, this simulated behaviour can also be derived using just two terms in Equation (1) where $\alpha_2$ term is $-5\times10^{-5}$ and the $\alpha_4$ term is $5\times10^{-9}$ for type C behaviour, mass 100 Da, and these coefficients are multiplied by $-1$ for ions of type A behaviour mass 100 Da. All higher order $\alpha$ terms may be set to zero.

In a seventh embodiment, a longitudinal second electric field component is used with ions approximated using the same data for 2-propanone (dimer) as in the fourth embodiment. Again, the ions' mass is taken to be 116.16 amu, the low field mobility taken to be $1.85\times10^{-4}$ $m^2\cdot V^{-1}\cdot s^{-1}$, $\alpha_2$ taken to be $7.44\times10^{-6}$ $Td^{-2}$ and $\alpha_4$ taken to be $-6.94\times10^{-10}$ $Td^{-4}$. A simulated type C ion can again be created using the same low field mobility with the, $\alpha_2$ and $\alpha_4$ terms multiplied by $-1$. The mobility variance of this ion is notably less pronounced than in the fifth and sixth embodiments, requiring a larger time-varying second electric field strength to separate the type A and type C ions fully.

The strip electrode geometry on planar opposing substrates is used, as described in relation to the data of FIG. 14, with the same time-invariant first electric field component applied as in the fifth embodiment. Two representative ions are simulated, both of mass 116.16 Da, started at ½0th of the distance from the axis to the upper strip electrodes, one of type C and one of type A mobility variance.

Figure 16:
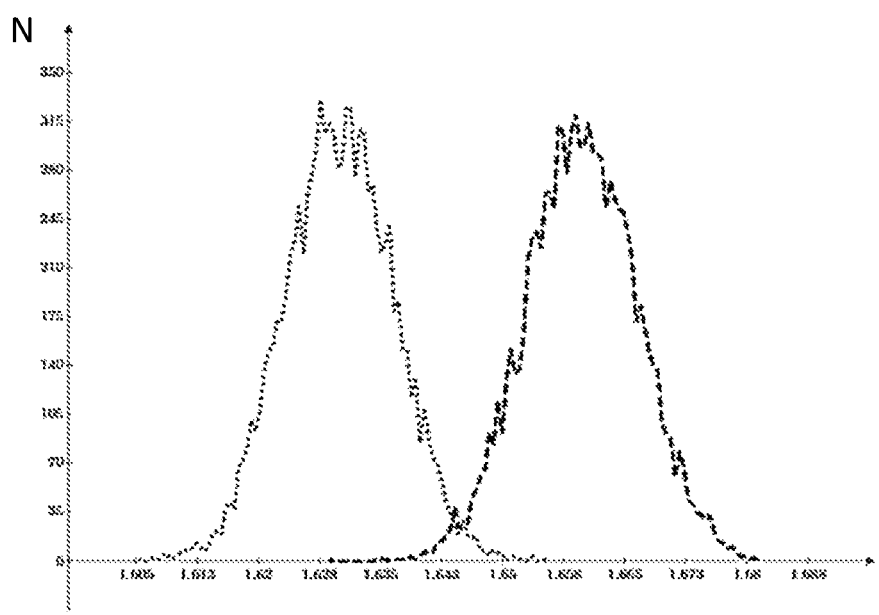
FIG. 16 shows a simulated time-of-flight spectrum in a seventh embodiment.

In the seventh embodiment, the time-varying voltage distribution as a function of axial distance along the drift tube is as in FIG. 13 but with the voltage scaled up by the factor 1/0.35 (i.e. the peak time-varying voltage is 10 kV) with a frequency of 1 MHz. In FIG. 16, a simulated time-of-flight spectrum (number of ions vs. arrival time (ms)) is shown for 20,000 ions of mass 116.16 Da as described above, in air at room temperature and atmospheric pressure. The dashed trace depicts the type C mobility variance ions and the dotted trace depicts the type A mobility variance ions.

FIG. 16 is a plot of a time-of-flight spectrum generated using the seventh embodiment, showing that both types of ions can again be clearly resolved. The longitudinal field strength is higher in this case than in the spectrum of FIG. 14. Nevertheless, the peak longitudinal field strength is $1.314\times10^6$ V/m, giving a peak longitudinal velocity of 247.3 m/s, and an RMS axial velocity of 141 m/s, both of which are substantial fractions of the speed of sound but still below the speed of sound in the gas. The RMS velocity is substantially lower than the peak velocity both because the applied field component is time-varying and because the field component is distributed along the axis by a cosine function (as described in relation to FIG. 13).

Figure 17:
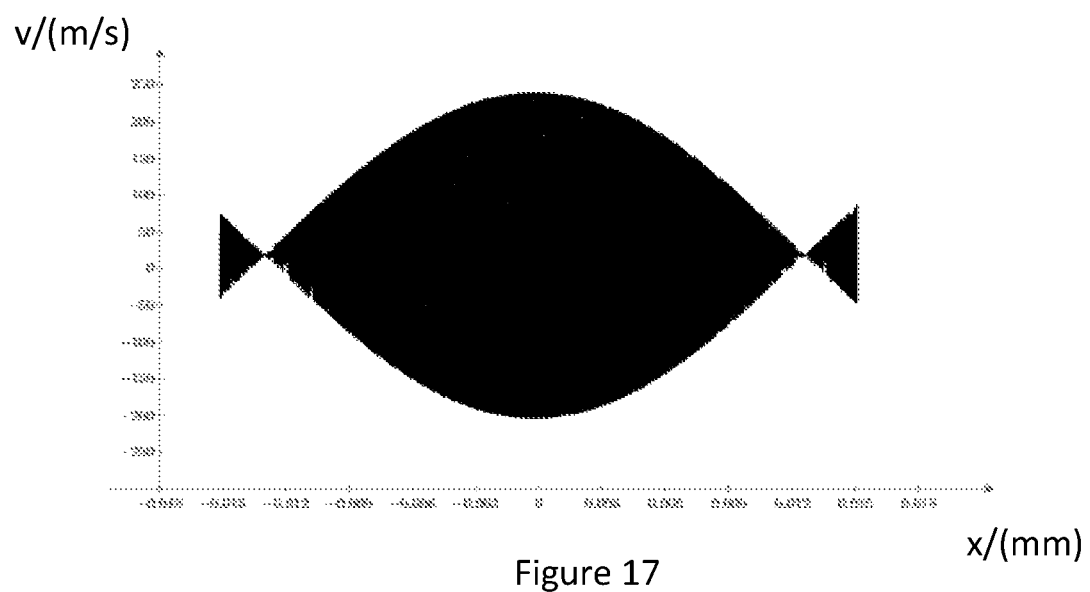
FIG. 17 shows the axial ion velocity against the axial position along the drift tube for the seventh embodiment.

The velocity of the type C ions is depicted in FIG. 17. Specifically, FIG. 17 shows the oscillating axial ion velocity (m/s) vs. axial position along the drift tube (m) for the type C ion of FIG. 16. There are many oscillations in the figure such that individual oscillations cannot be discerned. However, the envelope demonstrates that near the source and detector (i.e. at or near the ends of the drift tube), the time-varying axial velocity is low, and is a maximum half way along the drift tube.

It can therefore be seen from the fifth, sixth and seventh embodiments that the application of a longitudinal second electric field component provides improved separation relative to DT-IMS devices in the conventional arrangement.

Returning to the generalised language used previously, the present disclosure therefore also provides a method of separating a sample of ions according to their ion mobilities in which the second electric field component comprises a longitudinal part for at least a part of the length of the path, the longitudinal part being directed along the path so as to accelerate at least a portion of (or all of) the ions in the direction of the path. The use of a second electric field component having a longitudinal part is advantageous because higher amplitude ion oscillations can be tolerated, allowing a large degree of separation to be obtained. The second electric field component may comprise only a longitudinal part or only a transverse part, or it may comprise both a longitudinal part and a transverse part. Ions can be caused to accelerate along the path under the influence of a longitudinal electric field component. The longitudinal part is locally directed along the path. Hence, if the path is not straight then the longitudinal part can have a direction that varies along the path.

A longitudinal part may be provided using strip electrodes. For example, an axial electric field may be provided by time-invariant voltages applied to the strip electrodes, the same time-invariant voltage being applied to corresponding strips on the upper and lower substrates. Applying the time-varying field can be achieved by driving adjacent groups of electrodes on the upper substrate and their corresponding electrodes on the lower substrate with one polarity sinusoidal waveform, whilst driving other groups of electrodes on both upper and lower substrates with the opposite polarity sinusoidal waveform. The sizes of the groups may be chosen to minimise the variation in axial field produced as a function of distance from the axis.

As noted previously in relation to the case in which the second electric field component has a transverse part, a second electric field component having an arbitrary direction can be resolved into components. The choice of basis directions can be made arbitrarily, so any three-dimensional electric field can be resolved into a component that is directed along the path. As the transverse part is perpendicular to the longitudinal part, the two parts can be used as an orthogonal basis. Hence, the electric field component can be considered to have a longitudinal part and this longitudinal part can be obtained by projecting the electric field component along the path. If the second electric field component is purely transverse, then the longitudinal part will have a magnitude of zero. Similarly, if the second electric field component is purely longitudinal then the transverse part will have a magnitude of zero.

The longitudinal part may comprise an asymmetric time-varying electric field component. Additionally or alternatively, the longitudinal part may comprise a symmetric time-varying electric field component. These may be used to accelerate the sample of ions along the path and then to decelerate the sample of ions. For instance, the superposition of the first and second electric field components may lead to ions accelerating to a substantial fraction of the speed of sound in the gas for a fraction of a cycle of the waveform, before being decelerated.

The longitudinal part may vary according to: a sinusoidal waveform; a square waveform; a rounded square waveform; a triangular waveform; a rounded triangular waveform; a sawtooth waveform; a rounded sawtooth waveform; a pulsed waveform; and/or a rounded pulsed waveform. Any type of longitudinal waveform may be provided by superimposing any number of these types of waveforms. The longitudinal part may vary according to a waveform by virtue of: the electric field having such a waveform; or the voltages applied to electrodes having such a waveform.

The longitudinal part may vary with a frequency of from 1 kHz to 100 MHz, preferably from 1 kHz to 10 MHz, preferably from 2.5 kHz to 1 MHz, preferably from 5 kHz to 500 kHz, and more preferably from 50 kHz to 100 kHz. An advantage of using a longitudinal second electric field component is that lower frequencies can be used, because the axial extent of a drift tube is typically much greater than its transverse extent. Hence, ions can be caused to oscillate longitudinally with relatively large amplitudes without significantly increasing the risk of ions being lost to the walls of the drift tube.

Moreover, as the longitudinal part of the second electric field component is directed along the path within the drift tube, the longitudinal part does not in itself cause ions to move away from the path (i.e. towards the drift tube walls or electrodes). Hence, the longitudinal part of the second electric field component may comprise a time-invariant electric field component, which, alone, may cause the ions to accelerate along the path until they reach their terminal velocity and thereafter to remain substantially at that velocity. The time-invariant electric field component could be a DC bias of a time-varying waveform. Moreover, the time-invariant electric field component may have a constant electric field strength along the path, or it may have a spatial variation in field strength along the path.

The longitudinal part preferably comprises a DC (time-invariant) electric field component at one or both ends of the path. Thus, regions adjacent the input and output may be DC only. Advantageously, when a transverse second electric field component is applied for only part of the length of the path, the ion oscillations perpendicular to the drift tube axis can be minimised in the vicinity of the detector, ensuring that the ions have substantially only axial velocity components when they strike the detector, aiding detection. Likewise, the second electric field component can also be limited in the source region of the drift tube, so as not to interfere with beam pulsing (whether the second electric field component is transverse or longitudinal near the source region). The use of a DC electric field component at one or both ends of the path is therefore advantageous when the second electric field component comprises a transverse part and/or when the second electric field component comprises a longitudinal part. In any case, preferably, the amplitude of the second electric field component is greater at, or nearer to, the centre of the path than at one or both ends of the path.

It has been shown in these embodiments that the methods of the disclosure can be implemented in various electrode arrangements. Therefore, in the generalised terms used previously, in the methods of the present disclosure, applying the first and/or second electric field components preferably comprises applying a voltage to an electrode arrangement preferably comprising strip, planar and/or ring-shaped electrodes. It is straightforward and space-efficient to use a single electrode arrangement to provide the first and second electric field components.

The electrode arrangement preferably comprises at least a pair of capacitively coupled electrodes, wherein applying the second electric field component comprises applying a voltage having a first phase to one electrode of the pair whilst applying an opposite phase to the other electrode of the pair. There may be provided a plurality of such pairs of electrodes, each pair being capacitively coupled in this way.

Comparisons of FIG. 11 with FIGS. 14 and 15 show that employing an exclusively longitudinal time-varying waveform causes the ion transport time to be delayed slightly when compared with the use of an exclusively transverse time-varying waveform. Nevertheless, the delay is only some 2-4% longer. Therefore, time-of-flight spectra can be taken with much the same speed as when no time-varying field component is applied to the drift tube. The choice of whether to implement a transverse electric field component or a longitudinal electric field component can therefore be made based on other considerations, such as the specific sample to be analysed.

Due to the way that the electric fields combine, a larger total field vector is produced when the second and first electric field components are aligned in the same direction, i.e. a longitudinal second electric field is applied and combines with the first electric field which acts longitudinally. In this case the total field vector is the sum of the first and second field component vectors and the magnitudes simply add. Conversely, if the second field vector acts transversely on the ions, the first and second field component vectors combine by adding the magnitudes in quadrature, and a smaller total field vector results. For some geometries of apparatus, this might favour the use of longitudinal second field components. However, for other drift tube geometries a larger magnitude second field component vector can be created by the application of lower voltages if the second field component vector is transverse, due to the relative positions of the drift tube electrodes, and this might then favour the use of transverse second field component vectors. Embodiments utilising a transverse second electric field component (such as in the second to fourth embodiments) may be preferred when ions of interest have a larger longitudinal diffusion coefficient than transverse. Embodiments utilising an axial or longitudinal second electric field component (such as the fifth to seventh embodiments) may be preferred when ions of interest have a larger transverse diffusion coefficient than longitudinal.

However, and as noted previously, it is also possible to employ a transverse electric field component in one region of the drift tube and a longitudinal electric field component in another region of the drift tube, or for the second electrode field component to vary between being longitudinal and transverse. Such approach may be used to provide a compromise between the relative advantages of each form of second electric field component.

In the generalised terms used previously, the method may comprise applying the second electric field component for only a part of the length of the path; or less than or equal to 10% of the length of the path; or less than or equal to 25% of the length of the path; or less than or equal to 50% of the length of the path; or 50% or more of the length of the path; or 75% or more of the length of the path; or all of the length of the path. The proportion of the drift tube to which the second electric field component is applied may be selected depending on the specific sample to be analysed, because different samples may separate to different extents under the influence of the second electric field component. For example, it may not be necessary or desirable to employ a second electric field component for the entire length of the path within the drift tube if applying the component for only 10% of the length of the tube provides adequate separation of peaks. Similarly, the method may comprise applying the second electric field component for only a part of the time that the sample of ions is moving along the path, or for the whole time.

The peak velocity and the RMS velocity for a similar degree of peak separation are lower when the second, time-varying electric field component is longitudinal than when transverse. This might suggest that longitudinal mode will give lower diffusion-induced peak broadening. However, diffusion coefficients are most often highest in the direction of the applied field, and in the case of the transverse field component, a higher diffusion across the drift tube might be easily tolerated as it will not alone affect peak broadening.

In generalised terms, applying the first and second electric field components may comprise causing: an electric field strength within the drift tube of greater than or equal to $10^5$ V/m; $2.5 \times 10^5$ V/m; or $5 \times 10^5$ V/m; or $10^6$ V/m; or $1.1 \times 10^6$ V/m; or $1.2 \times 10^6$ V/m; or $1.5 \times 10^6$ V/m; or $2 \times 10^6$ V/m; or $3 \times 10^6$ V/m; or $5 \times 10^6$ V/m; or $10^7$ V/m at atmospheric pressure; and/or a normalised electric field strength (at atmospheric pressure or any other pressure) within the drift tube of greater than or equal to: $3.7 \times 10^{-21}$ V·m$^2$; $9.3 \times 10^{-21}$ V·m$^2$; or $1.9 \times 10^{-20}$ V·m$^2$; or $3.7 \times 10^{-20}$ V·m$^2$; or $4.1 \times 10^{-20}$ V·m$^2$; or $4.5 \times 10^{-20}$ V·m$^2$; or $5.6 \times 10^{-20}$ V·m$^2$; or $7.4 \times 10^{-20}$ V·m$^2$; or $1.1 \times 10^{-19}$ V·m$^2$; or $1.9 \times 10^{-19}$ V·m$^2$; or $3.7 \times 10^{-19}$ V·m$^2$. Such field strengths are capable of modifying ions' mobilities so as to enhance resolution when analysed using the disclosed embodiments. Other field strengths may be used depending on the sample to be used and the gas within the drift tube.

Applying the first and second electric field components preferably accelerates at least a portion of the sample of ions to a substantial fraction (i.e. 10% or higher) of the speed of sound in the drift tube. The ions may even exceed the speed of sound in the gas for at least a fraction of a waveform. For example, ions may be accelerated to substantial fractions of the speed of sound, i.e. greater than or equal to: 10% (and preferably no more than 25%, 50%, 75%, 90%, 100%, 110% or 125%) of the speed of sound in the gas; 25% (and preferably no more than 50%, 75%, 90%, 100%, 110% or 125%) of the speed of sound in the gas; 50% (and preferably no more than 75%, 90%, 100%, 110% or 125%) of the speed of sound in the gas; 75% (and preferably no more than 90%, 100%, 110% or 125%) of the speed of sound in the gas; 90% (and preferably no more than 100%, 110% or 125%) of the speed of sound in the gas; 100% (and preferably no more than 110% or 125%) of the speed of sound in the gas; or 110% (and preferably no more than 125%) of the speed of sound in the gas. Nevertheless, in some cases it may be possible to observe an improvement in separation when speeds lower than 10% of the speed of sound are attained, depending on the specific ions being analysed and the drift tube dimensions.

In all embodiments described above, the drift tube is at atmospheric pressure (i.e. approximately 101.3 kPa). Nevertheless, the drift tube may be at: above atmospheric pressure; atmospheric pressure; or below atmospheric pressure. The degree of ion separation may be increased by using higher gas pressures. However, higher pressures increase the number of collisions between ions and the gas and therefore reduce drift times. Therefore, the optimal pressure for a given drift tube gas may depend on the specific sample to be analysed. The pressure may be adjustable and controllable. In some examples, pressures below atmospheric pressure may be used, such as: from 100 Pa to 101.3 kPa; from 1 kPa to 101.3 kPa; from 10 kPa to 101.3 kPa; from 25 kPa to 101.3 kPa; from 50 kPa to 101.3 kPa; from 75 kPa to 101.3 kPa. Alternatively, pressures above atmospheric pressure may be used, such as: from 101.3 kPa to 110 kPa; from 101.3 kPa to 125 kPa; from 101.3 kPa to 150 kPa; from 101.3 kPa to 175 kPa; from 101.3 kPa to 200 kPa.

It can be seen that the various embodiments disclosed herein can utilise the length of the drift tube together with modest second electric field strengths to produce time-of-flight spectra in which differential ion mobility can separate ions with similar low field mobilities (which are therefore difficult to resolve using conventional DT-IMS) but with different mobility variance characteristics. The embodiments described have been demonstrated by the separation of type A and type C mobility variance ions but can also be used with type B mobility variance ions. Many molecular ion species have type A mobility variance, but the coefficients of Equation (1) differ for each species. In the case of two species of ions of similar low field mobility, which both have the same type of mobility variance (e.g. type A), the disclosure may separate these two species if the mobility variance of the two species of ion, whilst being of the same type, nevertheless are described by different coefficients. In other words, the utility of the present disclosure is not limited to the separation of different types of mobility variance ions. All that is required is a difference in mobility variance between the ions of interest and interfering ions.

The first electric field component can take various forms in each of the described embodiments. For instance, the first electric field component may be constant along the path, or have a constant gradient along the path, or have a gradient that varies along the path. Applying the first electric field component may comprise applying a drift tube field.

In the embodiments described previously, a sample of ions is introduced into the drift tube. Accordingly, it will be understood that the present disclosure also encompasses a method having a step of ionising a sample to generate the sample of ions prior to receiving the sample of ions into the drift tube. The apparatus of the disclosure may therefore comprise an ion source for providing the sample of ions. The sample may be ionised by any suitable method. For example, the ion source may ionise the sample by any of corona discharge, atmospheric pressure photoionisation, electrospray ionisation, radioactive atmospheric-pressure chemical ionization and/or matrix-assisted laser desorption/ionisation (MALDI). The sample of ions is typically received by the drift tube as a short pulse. The ion source is therefore preferably a pulsed ion source. The pulsed ion source may inherently produce pulses (e.g. MALDI) and/or may comprise a pulser to produce a pulse of ions, for example a pulsed ion gate, pulsed orthogonal accelerator, or an ion trap having pulsed ejection.

Similarly, in the previously described embodiments, ions' arrival times at the end of the drift tube are determined by simulations. Nevertheless, the methods and apparatus of the present disclosure also encompass detection of ions using a detector. In particular, there is provided a method of performing ion mobility spectrometry comprising the steps of: separating a sample of ions using the any of the methods of the disclosure; and detecting the separated sample of ions using a detector (e.g. a detector comprising one detector element, or a detector arrangement comprising a plurality of detector elements). The detector may comprise a Faraday plate detector or any other type of detector for detecting ions. Preferably, the methods of the disclosure comprise recording data indicative of the number of ions incident upon the detector over time. An ion mobility spectrum can thereby be obtained. The method may comprise storing the data in a database.

The apparatus disclosed herein can be operated as differential mobility analysers (DMAs), which operate on the same time-of-flight principle as drift tubes, but in a DMA, the gas flow turns the time-of-flight separation into a spatial separation on an exit plane of the analyser. The present disclosure changes the times-of-flight of ions by changing their mobility, and causes the ions to arrive at different locations on the exit plane than they would do under the normal low field conditions used in known DMAs. Because in a DMA, time-of-flight is converted into a spatial dispersion, this allows DMAs to be run in a continuous mode, instead of a pulsed mode.

As noted previously, in some embodiments, the detector may be part of a mass spectrometer in order to provide IMS-MS. Hence, an ion-mobility spectrometry-mass spectrometer is also provided that comprises: the apparatus as disclosed herein; and a mass spectrometer configured to receive separated ions from the ion mobility spectrometer. The mass spectrometer may be configured for $MS^1$, $MS^2$ and/or $MS^n$ (n=3 or higher) mass analysis. The mass spectrometer may comprise at least one fragmentation cells for fragmentation of the ions. The mass spectrometer may comprise at least one mass filter or mass analyser, such as a quadrupole mass filter, ion trap mass analyser, time of flight mass analyser, Fourier transform mass analyser, orbital trapping mass analyser (such as Orbitrap™ mass analyser), magnetic sector mass analyser etc.

In the described embodiments, the degree of separation has been demonstrated for different specific electric field components. However, an advantage of the present disclosure is that the degree of change to the mobility of ions may be set (and varied) electronically, preferably by adjusting the amplitude of the voltage waveform applied to the electrodes that create the second (e.g. sinusoidal transverse and/or longitudinal) electric field component. Unresolved peaks may be split apart by different amounts in successive spectra taken under different applied waveforms for the same sample. This may aid identification of the sample or species within the sample. Other properties of the waveform can of course be adjusted to effect a change in the degree of separation. Comparison of such spectra also allows conventional FAIMS or DMS spectra to be retrieved and utilised in the identification of ion species, with the advantage that the full FAIMS spectrum can be measured without the loss of sample ions that is suffered by conventional FAIMS bandpass filtering (where ions are lost to the electrodes). Comparison between spectra taken with different applied fields and spectra in a database can be made to assist identification, such database spectra being either conventional IMS or conventional FAIMS/DMS spectra, or both.

Hence, in generalised terms, the methods of the disclosure preferably also comprise a step of adjusting the degree of separation of the sample of ions by adjusting one or more properties of the first and/or second electric field components, wherein the one or more properties preferably comprise one or more of: amplitude; frequency; phase; and/or waveform. For instance, the waveform may be adjusted to reduce or increase the proportion of the drift tube length that is subjected to a second electric field component, thereby reducing or increasing the duration of time in which ions' mobility is modified. Database spectra can also be provided by the apparatus and methods described herein. For instance, the disclosure provides, in general terms, a database comprising at least one spectrum obtained using any of the methods described herein. Preferably, the database comprises one or more properties of the first and/or second electric field components associated with the at least one spectrum. For example, each spectrum may be stored in association with data indicative of the voltages, the resultant electric field strengths, the drift tube conditions (e.g. temperature, pressure and/or gas flow rate), or any other property using which the spectrum was obtained.

The present disclosure also provides methods of performing ion mobility spectrometry comprising the steps of: separating a sample of ions using the methods described above; and detecting the separated sample of ions using a detector (e.g. a detector comprising one detector element, or a detector arrangement comprising a plurality of detector elements). This preferably comprises recording data indicative of the number of ions incident upon the detector over time. The disclosure also provides a method of: performing ion mobility spectrometry (as described above); or obtaining differential mobility analyser (DMA) data sets; a plurality of times to obtain a plurality of ion mobility spectra or DMA data sets, each ion mobility spectrum being obtained using: second electric field components having different electric field strengths; second electric field components applied for different proportions of time; and/or second electric field components that are applied over portions of the drift tube having different lengths. This allows different the separation between peaks to be controlled and enhanced under various conditions, allowing information otherwise unobtainable from conventional DT-IMS to be retrieved from a sample. The step of detecting the separated sample of ions may be preceded by a step of mass analysis of the separated ions. In embodiments in which a gas flow is provided within the drift tube, ion mobility spectra or differential mobility analyser (DMA) data sets (e.g. a data set describing any aspect of ions' behaviour, such as ions' arrival times at a detector and/or a count of ions arriving at a given detector, such as acquired during operation of the apparatus as a DMA) may be based on different rates and/or directions of gas flow within the drift tube.

A method of identifying one or more species within a sample of ions is also provided. The method comprises: comparing an ion mobility spectrum or differential mobility analyser data set for the sample of ions obtained using the methods described above against a reference ion mobility spectrum or differential mobility analyser data set; and identifying one or more species within the sample of ions based on the comparison. The comparison may involve comparing peak arrival teams, comparing the shape (e.g. FWHM) of the arrival time curve, or comparing any other properties of ion mobility spectra. The comparison may return an identification when a similarity condition is satisfied, for example if the ion mobility spectra show peaks having similar arrival times or intensity profiles that correspond to within a threshold degree of correspondence. The comparison may involve searching for a search spectrum within a database and identifying one or more spectra in the database that exhibit a degree of similarity with the search spectrum. Search results may be provided together with an indication of the likelihood that each of the identified one or more spectra match the search spectrum. The step of comparing preferably comprises comparing ion mobility spectra or differential mobility analyser data sets obtained using second electric field components having the same electric field strength.

In the embodiments described above, the second electric field component is chosen so as not to cause ions to gain a substantial net velocity perpendicular to the path 220 within the drift tube 202. However, the present disclosure also provides a method and apparatus in which ions are deliberately caused to move away from a path within the drift tube. These methods and apparatus provide the same advantages in terms of the degree of separation and throughout that are obtainable.

Figure 18:
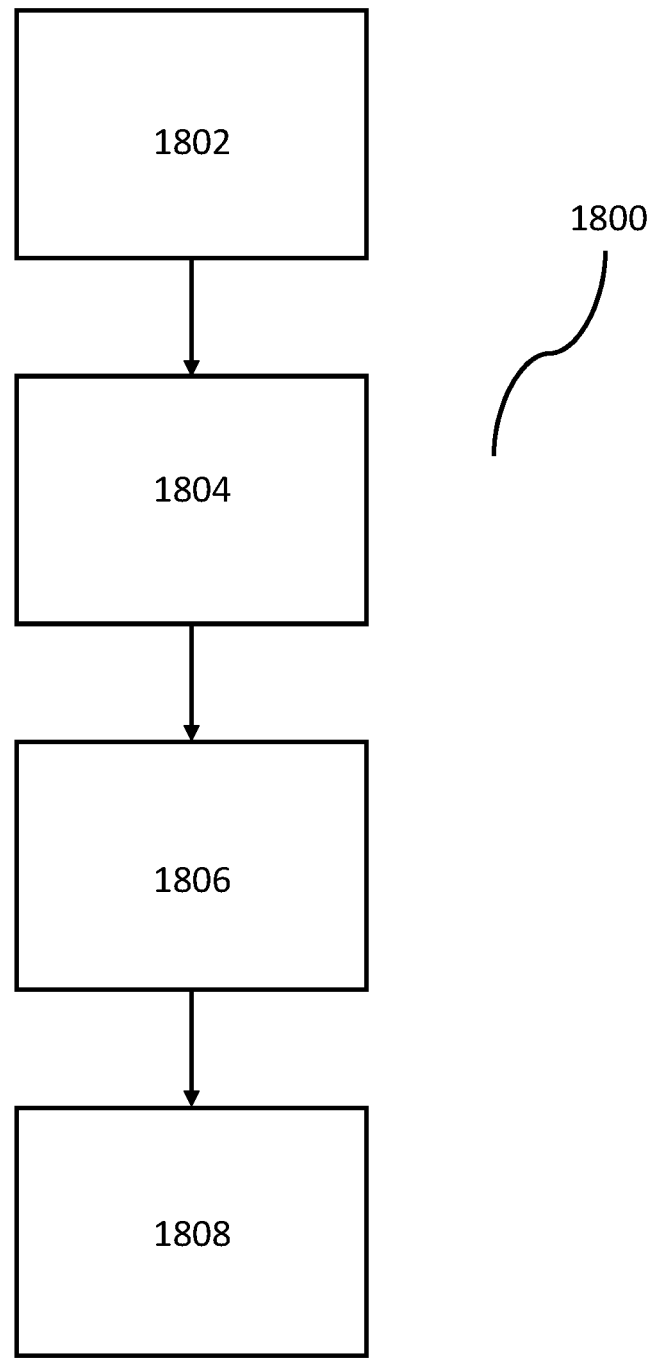
FIG. 18 shows a schematic diagram of a method of performing ion mobility spectrometry.

Such a method 1800 is depicted in FIG. 18, which is similar to FIG. 1 and which shows a method 1800 of performing ion mobility spectrometry on a sample of ions. The method 1800 comprises the steps of, receiving 1802 the sample of ions, applying 1804 a first electric field component, applying 1806 a second electric field component and detecting 1808 ions.

The step of receiving 1802 the sample of ions comprises receiving the sample of ions into a drift tube. Applying 1804 a first electric field component causes the sample of ions to move along a path within the drift tube towards a detector arrangement, whereby the sample of ions separates along the path. Applying 1806 a second electric field component comprises applying a second electric field component such that the first and second electric field components have a combined electric field strength so as to modify the ion mobility of at least a portion of the sample of ions and to cause at least a portion of the sample of ions to move away from the path. Thus, at least a portion of the sample of ions undergo a change of mobility. The step of detecting 1808 ions comprises detecting ions incident on the detector arrangement at a plurality of distances from the path. As with the previously-described embodiments, this embodiment can increase the separation of ions through the use of non-linear ion mobility at high values of normalised electric field (E/N).

Figure 19:
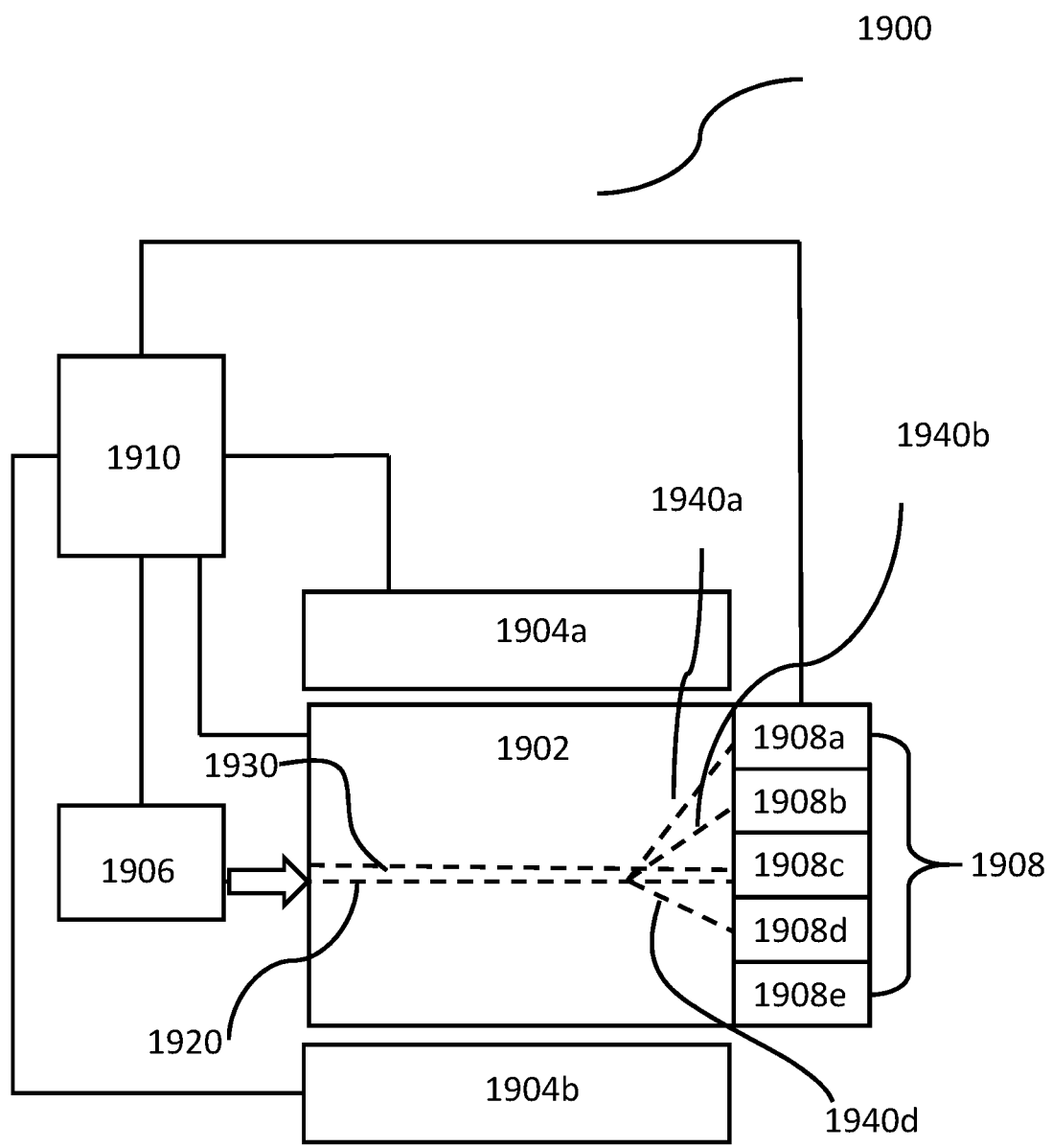
FIG. 19 shows a schematic diagram of an ion mobility spectrometer.

In FIG. 19, there is shown a schematic diagram of an ion mobility spectrometer 1900 capable of performing the generalised method 1800 depicted in FIG. 18. The ion mobility spectrometer 1900 in FIG. 19 is similar to the apparatus 200 and 500 of FIGS. 2 and 5, but differs in several important respects as detailed below.

The ion mobility spectrometer 1900 comprises an ion source 1906 for introducing a sample of ions into a drift tube 1902. A path 1920 is defined within the drift tube 1902 and extends between the ion source 1906 and a detector arrangement 1908. In FIG. 19, the path 1920 (defined by the first electric field component) is slightly offset from (i.e. spaced apart from) the axis 1930 of the drift tube 1902. The arrangement in FIG. 19 has an ion source 1906 and a detector arrangement 1908 respectively positioned at an inlet and outlet of the drift tube 1902, with the path 1920 extending out of the ends of the drift tube 1902 to the ion source 1906 and to the detector arrangement 1908. Electric fields acting along the direction of the axis are employed in both the extended regions to drive ions in the direction of the detector.

The detector arrangement 1908 in FIG. 19 comprises five distinct detector elements 1908a-1908e (although any number of elements may be used, except for 0 and 1), which are disposed at one end of the drift tube (at the outlet of the drift tube 1902) and which extend transversely across the entire width of the width of the drift tube 1902 (although they could extend across only a fraction of the width of the drift tube 1902) and a substantial fraction of the electrode arrangement 1904. Hence, the ion mobility spectrometer 1900 is a multicollector ion mobility spectrometer. The path 1920 extends towards a central detector element 1908c of the detector arrangement 1908. The detector element 1908c is "central" in that it is substantially aligned with the path 1920. However, the path 1920 is substantially parallel with but offset from the axis 1930 of drift tube 1902. Therefore, the detector element 1908c is not aligned with the axis 1930.

Two electrodes 1904a and 1904b are disposed adjacent the drift tube 1902 and together form an electrode arrangement 1904 for applying an electric field (e.g. the electric field resulting from the superposition of the first and second electric field components applied when the method 1800 of FIG. 18 is performed) within the drift tube 1902. A controller 1910 is shown coupled to the drift tube 1902, the electrode arrangement 1904, the ion source 1906 and the detector arrangement 1908. In this case, the second electric field component is an asymmetric time-varying waveform.

In use, the ion mobility spectrometer 1900 depicted in FIG. 19 analyses a sample of ions. The ion source 1906 provides a sample of ions for separation. The sample of ions is introduced from the ion source 1906 into the drift tube 1902, following which the controller 1910 causes the electrode arrangement 1904 to apply first and second electric field components within the drift tube 1902. As in the method 1800 depicted in FIG. 18, the application of the first electric field component causes the sample of ions to move generally in the direction of the path 1920 towards the electrode arrangement 1908 and the application of the second electric field component causes ions' mobilities to change. However, in contrast to the embodiments described in relation to FIGS. 1 to 17, in this case the second electric field component also causes at least some ions in the sample of ions to move substantially away from the path 1920 such that some ions' trajectories are substantially different to the path 1920 within the drift tube 1902 and optionally also in any extended path between the end of the drift tube and the detector.

Such ion trajectories 1940 are shown in FIG. 19. The trajectories 1940a, 1940b and 1940d show approximate trajectories of three different types of ions deflected by the electrode arrangement 1904. The trajectories 1940a, 1940b and 1940d are approximate, because the ions may oscillate about the depicted trajectories 1940a, 1940b and 1940d (i.e. move away from and then back towards the trajectories 1940a, 1940b and 1940d one or a plurality of times). Ions travel substantially along the path 1920 for a part of the length of the path 1920, indicating that the second electric field component is weak near the ion source 1906 and inlet of the drift tube 1902. The ions are then deflected away from the path 1920, towards the electrode 1904a or 1904b, depending on the mobility characteristics of the ions. In other words, in FIG. 19, the ions' motion through the drift tube 1902 comprises two distinct regimes: in the first regime, the ions' trajectories 1940a, 1940b and 1940d are substantially coincident with the path 1920; in the second regime, the ions follow trajectories that substantially deviate from the path 1920 near the detector 1908 arrangement.

The degree and direction of deflection reflects the specific second electric field component used in this figure and the type of ions analysed. The trajectories 1940a and 1940b deviate from the path 1920 (in the same direction) by different extents because the second electric field component influences ions' motions to different extents depending on a number of factors. The trajectories 1940a and 1940b are shown as being directed towards electrode 1904a as they are of one type of ion mobility. The ions that follow trajectory 1940d have the opposite mobility type (i.e. type A rather than type C, or vice versa) and move towards electrode 1904b. Moreover, the degree of transverse movement of the ions differs dependent on various factors including the ionic species, the ionic charge, the ions' mobility and differential ion mobility, and the various properties of the applied electric field components. In other words, the ions that follow trajectory 1940a have a different response to the applied electric field components than the ions that follow trajectory 1940b, and these also have a different response to the applied electric field components to the ions that follow trajectory 1940d. Thus, the method of FIG. 18 and the ion mobility spectrometer of FIG. 19 cause not only temporal separation of ions (in terms of their arrival time), but also spatial separation of ions in the transverse direction (i.e. perpendicular to the path 1920).

The sample of ions is separated as it moves along the path 1920 by differences in mobility, such that ions arrive at the detector arrangement 1908 at a plurality of times. The path 1920 extends towards the detector arrangement 1908, which detects ions incident thereupon. As the ions are separated as they travel along the path 1920, ions reach the detector arrangement 1908 at a plurality of times. Accordingly, the detector arrangement 1908 records data indicative of the number of ions incident thereupon over time. This data may be stored in the form of an ion mobility spectrum.

Moreover, the detector arrangement 1908 is arranged to detect ions incident thereon at a plurality of distances from the path 1920 by virtue of comprising a plurality of detector elements 1908*a-e*. Ions that traverse trajectory 1940*a* are incident upon and detected by detector element 1908*a*. Ions that traverse trajectory 1940*b* are incident upon and detected by detector element 1908*b*, which is positioned at a different distance from the path 1920 than the detector element 1908*a*. Ions that traverse trajectory 1940*d* are incident upon and detected by detector element 1908*d*, which is positioned at the same distance (but in the opposite direction) from the path 1920 as detector element 1908*b*. Therefore, the ion mobility spectrometer 1900 may record an indication of the number of ions incident upon each detector element 1908*a-e* over time. Additionally or alternatively, the ion mobility spectrometer 1900 may record data indicative of the number of ions incident on the detector arrangement 1908 together with data indicative of the distance of such ions from the path 1920 when they arrive at the detector arrangement 1908. In other words, a spectrum may be obtained by each detector element 1908*a-e* and stored in association with: an identifier for the specific element 1908*a-e*; or a distance from the path 1920.

The controller 1910 is coupled to each of the drift tube 1902, the electrode arrangement 1904, the ion source 1906 and the detector arrangement 1908. Accordingly, the controller can be used to control the operations of each component of the ion mobility spectrometer 1900 and/or send/receive data (e.g. operating parameters and/or measurements) to/from each component of the ion mobility spectrometer 1900. For instance, the controller 1910 can control the pressure, temperature and/or gas flow rate within the drift tube 1902.

Moreover, the controller 1910 controls the properties (including, for example, phase, amplitude, frequency, waveform) of the voltages or fields applied to the electrodes in order to generate the first and second electric field components. The controller 1910 can also control the operation of the detector arrangement 1908, for instance by activating and deactivating the detector arrangement 1908 and/or controlling by its sensitivity.

Thus, the controller 1910 may record further data in addition to the data indicative of the number of ions incident upon the detector arrangement 1908 over time. For example, the controller 1910 can also record some or all of the operating parameters of the drift tube 1902, the electrode arrangement 1904, the ion source 1906 and/or the detector arrangement 1908. These operating parameters can be stored in association with the data indicative of the number of ions incident upon the detector arrangement 1908.

Moreover, and as discussed in relation to FIG. 2, the specific arrangement depicted in FIG. 19 is schematic and provided for the purposes of illustration only. For instance, various different geometries for the drift tube 1902 and/or electrode arrangement 1904 can be employed. In particular, there is no requirement for the drift tube 1902 to have a straight axis 1930 or a straight path 1920 along which ions move. A curved drift tube 1902 could be employed, in which case the axis 1930 would be curved and the path 1920 within the drift tube 1902 could also be a curved path. In this case, the trajectories 1940 would deviate from a curved path rather than a straight path. Moreover, in such a case, the electrode arrangement 1904 could also be curved, for instance having a similar general shape to the drift tube 1902. There is also no need for the ions to travel parallel to the drift tube axis 1930. The path 1920 can be entirely distinct from and oriented differently to the axis 1930 of the drift tube 1902.

The electrode arrangement 1904 is depicted as having only two electrodes 1904*a* and 1904*b*, but may have any number of electrodes of any type or shape. As an example, the electrode arrangement 1904 can be implemented using the strip electrode geometry on planar opposing substrates as described in relation to FIG. 5. As shown in FIG. 19, the electrodes 1904*a* and 1904*b* are separate from the walls of the drift tube 1902, but the electrodes 1904*a* and 1904*b* could define the edges of the drift tube 1902, for example by being integrally formed with or affixed to the edges of the drift tube 1902.

Similarly to FIG. 2, the ion mobility spectrometer 1900 is depicted as having an ion source 1906, but the ion mobility spectrometer 1900 could instead be provided as a standalone instrument that entirely omits the ion source 1906. In such a case, the path 1920 may extend between an inlet of the drift tube 1902 (rather than the ion source 1906) and the detector arrangement 1908.

Returning to the generalised terms used previously, the present disclosure also provides an ion mobility spectrometer comprising: a drift tube for receiving the sample of ions; an electrode arrangement; a detector arrangement; and a controller configured to: cause the electrode arrangement to apply a first electric field component within the drift tube so as to cause the sample of ions to move along a path within the drift tube (including in the absence of any gas flow), whereby the sample of ions separates along the path; and cause the electrode arrangement to apply a second electric field component within the drift tube, the first and second electric field components having a combined electric field strength so as to modify the ion mobility of at least a portion of the sample of ions and to cause at least a portion of the sample of ions to move away from the path; wherein the detector arrangement is configured to detect ions incident on the detector arrangement at a plurality of distances from the path. The second electric field component may: be the same strength as the first electric field component; have a higher electric field strength than the first electric field component; or have a lower electric field strength than the first electric field component.

The detector arrangement preferably comprises a plurality of detector elements. These could be, for example, pixels of an array. However, the detector arrangement could be a single element capable of resolving ions incident thereon at a plurality of positions.

The step of detecting ions preferably comprises recording data indicative of the number of ions incident upon the detector arrangement over time. Thus, enhanced temporal separation of ions may be obtained.

The step of detecting ions may comprise recording data indicative of the number of ions incident upon the detector arrangement over time together with data indicative of the position of incidence on the detector arrangement. Such indicative data could be: data indicative of the distance from the path (e.g. in units of distance); and/or data indicative of a specific detector element upon which ions are incident (e.g. an identifier of a specific element or pixel whose distance from the path is known). The times of arrival of the ions at the detector relate generally to their respective ion mobilities (e.g. reduced field ion mobility), with some differences in arrival times arising due to differential mobility effects. The positions of arrival of the ions at the detector (i.e. distance from the path) relate to their respective mobility variance (differential mobility in high field). Thus, ions of similar ion mobility, can be resolved by the variance.

It will be understood that the method 1800 of FIG. 18 and the ion mobility spectrometer 1900 of FIG. 19 operate similarly to the embodiments illustrated in and described with reference to the embodiments of FIGS. 1 to 17, in that a drift tube 1902 separates a pulse of ions in their flight time according to their mobility. Prior to any detection of ions, an electric field waveform (which is preferably asymmetric) is applied transversely to the ions (preferably in the region close to the end of the drift tube 1902). The transverse waveform induces net transverse velocities to the ions according to their differential mobilities. The drift tube 1902 width in the direction of the transverse field component is dimensioned so that ions do not strike the drift tube walls, which may comprise electrodes 1904a and 1904b or which may be distinct from any electrode arrangement 1904. The transverse net velocities are induced for at least a part of the drift tube 1902 length and this separates the ions perpendicular to their flight along the drift tube 1902, whereupon they arrive at an array detector 1908. The detector 1908 has pixels separated across the transverse direction and each pixel can be read out independently. The time-of-flight of the ions along the drift tube can be measured and the position of ion arrival in the transverse direction can also be measured, providing information on the differential ion mobility of the different ion species. Use of both ion arrival time and arrival position allows otherwise unresolved peaks to be separated. Similarly to the embodiments depicted in FIGS. 1 to 17, no ions are filtered out.

A further advantage of the ion mobility spectrometer 1900 of FIG. 19 is that it is able to implement any method the present disclosure by applying a suitable second electric field component. In such a case, ions would only be incident upon one (or a small number) of the detector elements 1908a-e that are close to the path 1902. For example, a symmetric second electric field component could be applied, which would cause ions to oscillate about the path 1920 without gaining any net transverse velocity and so would be incident upon the central detector element 1908c of FIG. 19.

In FIG. 19, a constant amplitude (asymmetric and time-varying) second electric field component is applied along part of the path length (near the detector arrangement 1908), which causes ions to follow a substantially straight (but angled) trajectory from the path 1920 to the detector arrangement 1908. However, it is also possible to cause the ions to follow curved (i.e. not straight) trajectories away from the path 1920 within the drift tube. This may be achieved if the second electric field component is applied with increasing amplitude as a function of distance along the tube 1902. In other words, the second electric field component may have a ramped electric field strength.

The present disclosure provides various methods that can be performed automatically by an appropriately configured apparatus. For instance, the controllers 210 and 1910 may comprise processors capable of controlling the apparatus of this disclosure. To that end, in general terms, a computer program is provided, the computer program comprising instructions to cause any apparatus disclosed herein to execute the steps of the methods of separating ions and performing ion mobility spectrometry disclosed herein. Identification of species using spectra obtained using the present disclosure can be performed by a computer. To that end, a computer program is also provided comprising instructions that, when the program is executed by a computer, cause the computer to carry out any identification method described herein. Such computer programs may be stored on a computer-readable data carrier. For instance, a computer-readable (storage) medium may be provided and/or a data carrier signal may be provided.

Except for the specific form of the second electric field component and the capability of detecting of ions at a plurality of transverse positions, the method 1800 and ion mobility spectrometer 1900 of FIGS. 18 and 19 are similar to the methods and apparatus of FIGS. 1 to 17. Therefore, a full and detailed discussion of them is omitted for brevity, because any aspect of the methods and apparatus of FIGS. 1 to 17 can be implemented in the methods and ion mobility spectrometer of FIGS. 18 and 19.

Figure 20A:
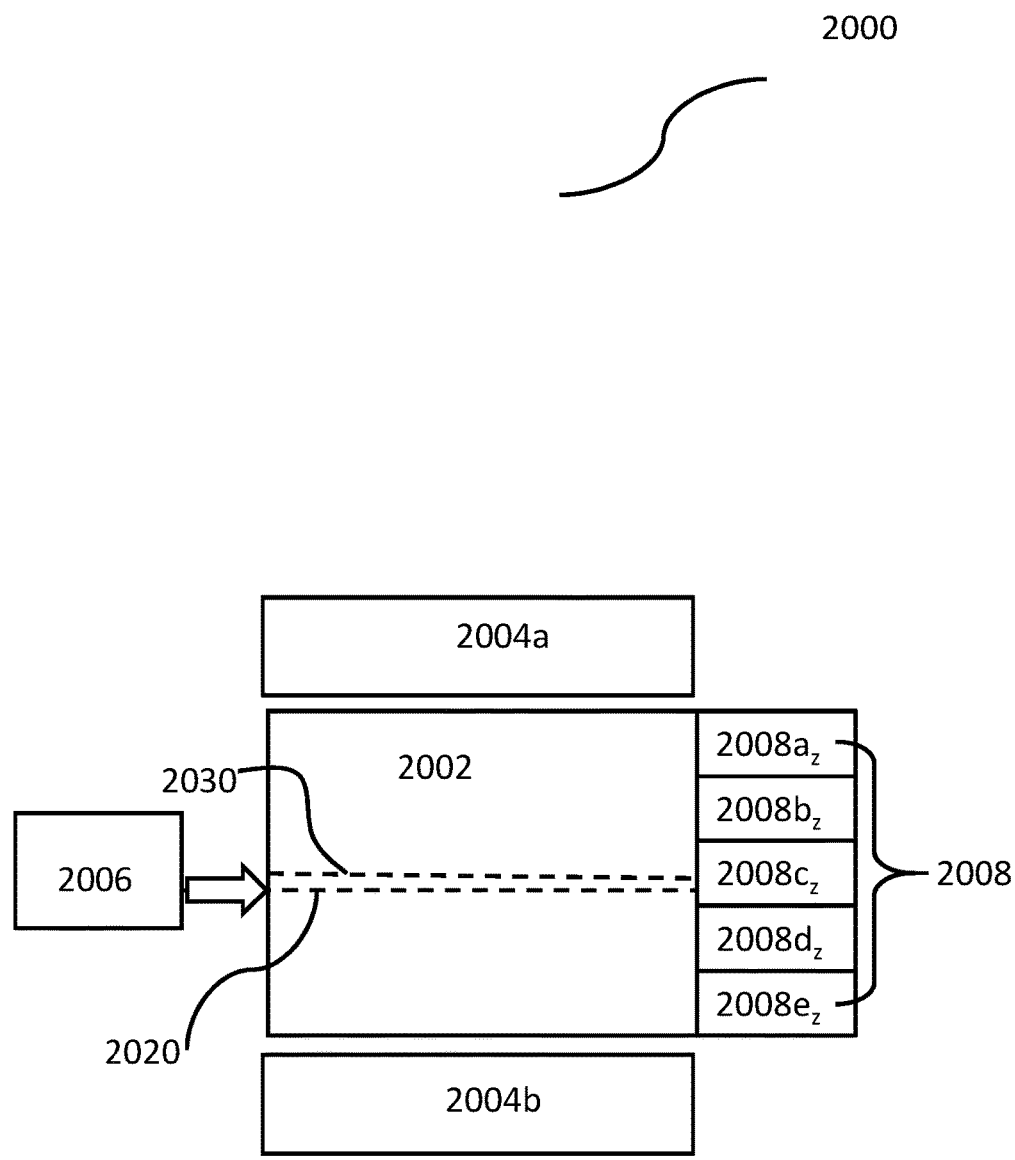
FIGS. 20A and 20B show a schematic diagram of an apparatus for separating ions according to an eighth embodiment.
Figure 20B:
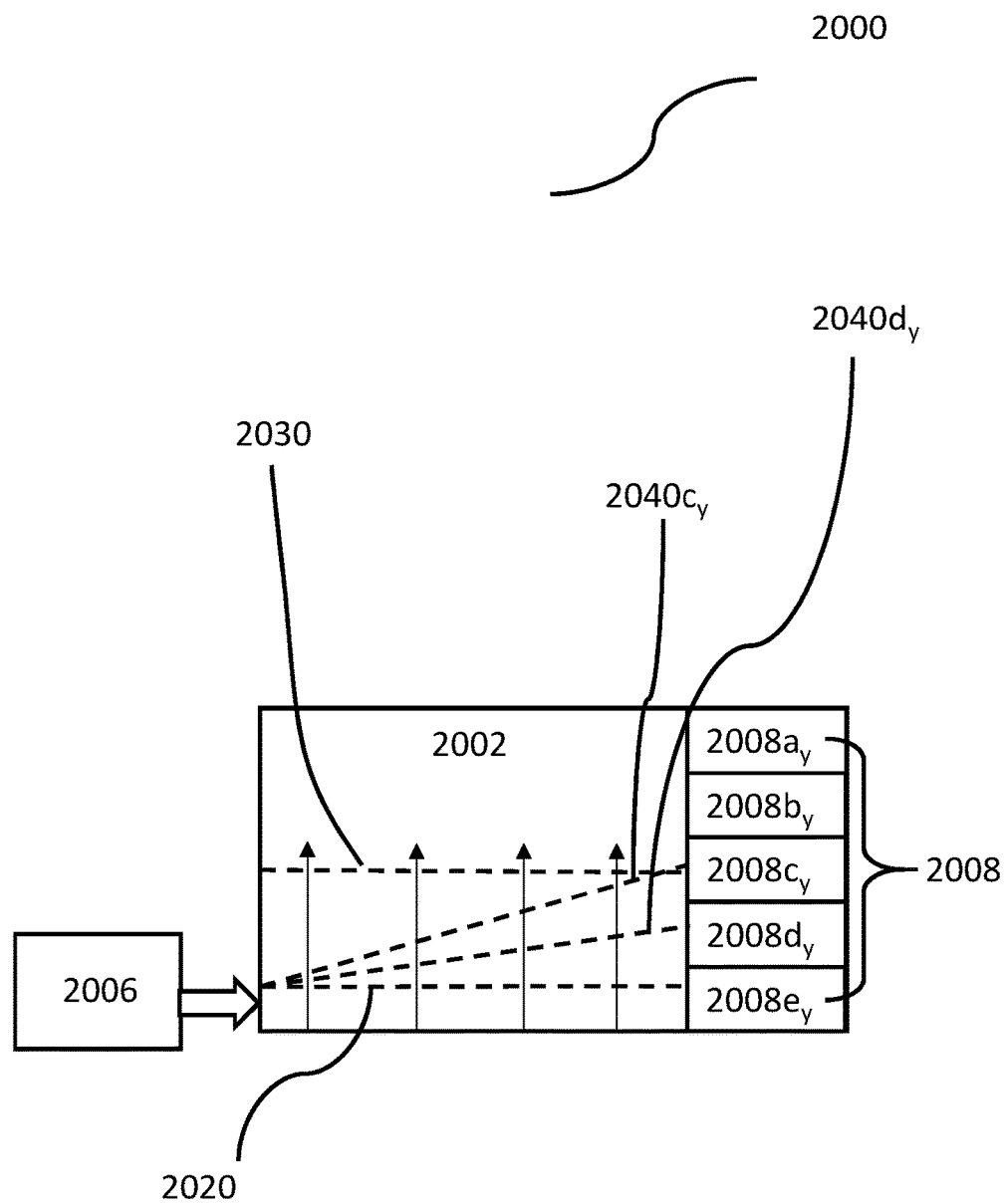

Turning next to FIGS. 20A and 20B, there are shown schematic diagrams of an apparatus 2000 for separating ions (e.g. a differential mobility analyser) according to an eighth embodiment. FIG. 20A shows the apparatus 2000 in the x-z plane and FIG. 20B shows the apparatus 2000 in the x-y plane. The apparatus 2000 is structurally similar to the apparatus 1900 shown in FIG. 19 in some respects. For example, as shown in FIG. 20A, the apparatus 2000 comprises a drift tube 2002 and an electrode arrangement 2004, comprising two (in this example, although more or fewer than two can be used) electrodes 2004a and 2004b, which are configured to apply an electric field (which comprises a plurality of electric field components) within the drift tube. The apparatus 2000 also comprises an ion source 2006 for introducing a sample of ions into the drift tube 2002. In practice, the apparatus 2000 comprises a controller (as described previously) to cause the components to operate, but the controller is omitted from FIGS. 20A and 20B for simplicity. Again, this apparatus 2000 can increase the separation of ions through the use of non-linear ion mobility. This apparatus 2000 differs from the previously-described apparatus due to the presence of a gas flow (which was not described in the previous embodiments to simplify the analysis) within the drift tube 2002, which will be discussed in further detail.

A path 2020 within the drift tube is defined by a first electric field component generated by the electrode arrangement 2004. As described previously, the path 2020 may be considered to be the trajectory that an ion would follow under the influence of the first electric field component applied within the drift tube 2002, in the absence of a second electric field component, any diffusion and any gas flow. For instance, the path 2020 may be considered to be the trajectory that an ion would follow in the drift tube 2002 due to the first electric field component if the drift tube 2002 was in a vacuum.

In the embodiment of FIGS. 20A and 20B, a detector arrangement 2008 is again provided at one end of the drift tube 2002 (i.e. the end of the drift tube 2002 that is at the opposite end of the path 2020 to the ion source 2006). When viewed in cross-section in the x-z plane, as in FIG. 20A, the detector arrangement 2008 comprises an array of detector elements $2008a_z$-$2008e_z$ and this cross-section of the detector arrangement 2008 appears similar to the detector arrangement 1908 of FIG. 19 and operates in a similar manner. In FIG. 20B, the detector arrangement 2008 is shown in cross-section in the x-y plane. In this plane, it can be seen that the detector arrangement 2008 also comprises a further array of detector elements $2008a_y$-$2008e_y$, which extend in the y-direction, i.e. perpendicular to the array of detector elements $2008a_z$-$2008e_z$. In this embodiment, the detector arrangement 2008 comprises a 5×5 array of detector elements, so it comprises 25 detector elements in total. It will be appreciated that in each direction, any number of elements in the y-direction may be used, except for 0.

In FIG. 20A, it is apparent that in the x-z plane, the ions do not gain any substantial velocity perpendicular to the path 2030, so detector elements $2008a_z$, $2008b_z$, $2008d_z$ and $2008e_z$ are essentially redundant because ions are only incident on detector element $2008c_z$. Thus, there may only be a single detector element in the z-direction in cases where the second electric field component does not cause any substantial net change in ions' velocities in the z-direction. Moreover, different numbers of detector elements can be provided in the y- and z-directions (e.g. a 3×5 array could be used, or a 7×1 array could be used). The detector arrangement can have different spatial extents in the y- and z-directions (e.g. being an oblong or rectangular array), or it can have the same spatial extent in the y- and z-directions (e.g. being a circular array, or a square array).

The apparatus 2000 of FIGS. 20A and 20B operates according to similar principles to the previously-described apparatus. In use, ions from the ion source 2006 enter the drift tube 2002, whereupon they move, under the influence of a first electric field component, along the path 2020. The ion source 2006 and the path 2020 are, in the x-z plane shown in FIG. 20A, close to (although slightly offset from) the drift tube axis 2030. In FIG. 20B, which shows the apparatus 2000 in the x-y plane, the ion source 2006 and the path 2020 are near a lowermost edge of the wall of the drift tube 2002. In other words, the path 2020 is off-centre and spaced apart from the drift tube axis 2030. Nevertheless, the path 2020 is substantially parallel to the drift tube axis 2030 (although this is not necessarily the case).

In this embodiment, the electrode arrangement 2004 again applies a second electric field component within the drift tube 2002 for at least a portion of the length of the path 2020, such that the ion mobility of at least a portion of the sample of ions is modified, to increase the separation of at least a portion of the sample of ions along the path 2020. The second electric field component can take at least two forms. It is preferred that the second electric field component is as described with reference to FIGS. 1 to 17, in that it substantially does not cause a net change in the velocity of the sample of ions perpendicular to the path 2020. This is shown in FIGS. 20A and 20B. In such a case, the second electric field component may be a (preferably symmetric) transverse electric field component or it may be a longitudinal electric field component. Thus, when viewed in the x-z plane, the ions do not deviate substantially from the path 2020 over the length of the drift tube 2002. Although ions may oscillate in the z-direction about the path 2020 under the influence of a symmetric second electric field component, such oscillations are omitted from FIG. 20A, for simplicity and because they do not arise from any net change in velocity perpendicular to the path 2020.

Nevertheless, it will also be understood that the second electric component can be as described in relation to FIGS. 18 and 19, where it does cause a net change in velocity perpendicular to the path 2020 for at least a portion of the length of the path 2020, and so the detector arrangement 2008 in FIG. 20A is shown as having 5 detector elements $2008a_z$-$2008e_z$. In such a case, the detector arrangement in FIGS. 20A and 20B can be a two-dimensional array. It will be understood that a controller could cause the electrode to be capable of switching between these two modes of operation (in which the second electric field component does or does not cause a net change in velocity perpendicular to the path 2020) by controlling the electrode arrangement 2004 accordingly. Moreover, the detector arrangement of FIGS. 20A and 20B, being a 2D array in y and z, can allow the analyser to be used as a combined FAIMS and mobility analyser through the application of appropriate electric field components and/or gas flows.

In any case, vertical arrows within the drift tube 2002 are shown in FIG. 20B, and these depict the direction of carrier gas flowing within the drift tube 2002, which is the main difference between this embodiment and the embodiments described previously. The flow of gas is substantially in the positive y-direction, and so is perpendicular to the drift tube axis 2030, which extends in the x-direction, and also perpendicular to the z-direction. As described previously, ions introduced into the drift tube 2002 would, in the absence of any gas flow, travel along the path 2020, perhaps with some oscillations about the path 2020 in the z-direction (i.e. into and out of the page, in FIG. 20B) due to the second electric field component. However, due to the perpendicular gas flow, ions drift away from the path 2020 in the y-direction, as shown by the ion trajectories $2040c_y$ and $2040d_y$ in FIG. 20B. The amount by which the ions spread in the y-direction depends on the time it takes the ions to drift the length of the drift tube 2002, which is dependent upon the ions' linear mobility in the applied electric field. Therefore, ions of different mobility are spread out in the y-direction by the gas flow in the y-direction.

Thus, in this embodiment, ions gain a net velocity perpendicular to the path 2020 due to the action of the gas flow. Nevertheless, it will be understood that in this case, the second electric field component still does not cause any substantial change in the ions' net velocity perpendicular to the path 2020. In generalised terms, this embodiment comprises providing a gas flow within the drift tube, and may comprise adjusting a flow rate of the gas flow. It is preferred that the gas flow is substantially perpendicular to: the path and/or; an axis within the drift tube, preferably the drift tube axis. Moreover, it is preferred that the gas flow is substantially perpendicular to the second electric field component. Thus, the gas flow may be orthogonal to the path and to the second electric field component. Providing the gas flow may cause at least a portion of the sample of ions to separate in the direction of the gas flow.

It will be understood that gas flow within the drift tube 2002 can be achieved by various means. For example, the drift tube 2002 may be provided with a gas inlet and a gas outlet (both of which are not shown) positioned so that gas flows across the drift tube 2002 in the y-direction. One or more fans may be provided, inside or outside the drift tube 2002, for effecting the flow of gas within the drift tube. Moreover, it will be understood that the gas flow within the drift tube 2002 can be directed at a non-perpendicular, non-zero angle to the path 2020, and this angle may be adjustable. For example, the gas flow may be at an angle of 45° to the path 2020 (e.g. at 45° to the x- and y-directions, and at 90° to the z-direction), thereby causing ions to move generally along the length of the drift tube 2002 while also causing ions to move perpendicular to the path 2020. Moreover, the flow rate of gas within the drift tube 2002 may be adjustable. In any case, causing gas to flow at an angle to the path 2020 can be used to increase the separation of ions.

Thus, when ions are introduced into the drift tube 2002 of this embodiment, they undergo motion in three dimensions under the influence of several factors: they travel in the direction of the drift tube axis 2030 under the influence of a first (typically relatively weak) electric field component; they drift in the y-direction under the influence of gas flow (and may also experience some drift due to gas flowing partially in the x-direction); and at least some ions undergo a change in ion mobility due to a (typically relatively strong) second electric field component, which may cause ions to oscillate about the path in the z-direction, or which may accelerate and/or decelerate ions along the path. The second electric field component can act in the y-direction in which case it is applied preferably for only part of the length of the drift tube so that the oscillations in the y-direction induced by the second electric field component are much smaller than the spread of any single species of interest within the beam due to diffusion when those ions reach the exit plane of the analyser. In any case, the motion of ions can be manipulated using electric field components and gas flow to increase the separation of the ions and hence also to increase resolution in measurements that depend on ion separation.

Due to this separation due to the gas flow, ions can be caused to separate in an additional dimension. In general terms, this embodiment comprises detecting ions incident on the detector arrangement at a plurality of distances from the path (e.g. a plurality of distance from the path in the y-direction, such as for detecting ions that have separated in the direction of a gas flow within the drift tube). The detector arrangement thus may comprise a plurality of detector elements (e.g. a 1D array in the y-direction, or a 2D array in the y- and z-directions if ions gain velocity in the z-direction). The step of detecting ions comprises recording data indicative of the number of ions incident upon the detector arrangement over time together with data indicative of the position (e.g. data identifying the particular element upon which ions were incident) of incidence on the detector arrangement.

The apparatus 2000 of FIGS. 20A and 20B can be used in similar ways to the disclosures of FIGS. 1 to 19. For instance, this apparatus 2000 can be used to generate spectra indicating the number of ions incident on the detector arrangement 2008 over time, for a plurality of positions. Such data can be stored in conjunction with data describing the field strengths of the first and/or second electric field components, and data indicating the properties of the gas flow (e.g. the rate and/or direction of gas flow) within the drift tube 2002. In general terms, measurements may be taken a plurality of times to obtain a plurality of ion mobility spectra or differential mobility analyser data sets, each ion mobility spectrum or differential mobility analyser data set being obtained using different rates and/or directions of gas flow within the drift tube and/or different first and/or second electric field components. Thus, enhanced spectra exhibiting improved separation and resolution can be provided.

The apparatus 2000 of FIGS. 20A and 20B may be considered as a generalised, improved, differential mobility analyser (DMA). A DMA is a time-of-flight type device that separates ions based on their linear mobility and is different from a differential mobility spectrometer (DMS), which is a type of FAIMS device. In a DMA, ions move from an entry plate to an exit plate in x by a DMA electric field (produced by the voltage applied across the exit to entry plates, perhaps aided by additional electrodes separated about the ion axis in the z-direction mounted upon side plates). Within that region, there is a gas flow which is in the y-direction, typically perpendicular to the electric field. In a sufficient gas pressure (which certainly includes atmospheric pressure, but can also include lower pressures). This gas flow causes ions to be shifted in the y-direction by an amount that depends on the time it takes the ions to drift from the entry plate to the exit plate under the action of the DMA field. This time is dependent upon the ions' linear mobility in the applied electric field. Thus, ions of different mobility are spread out in the y-direction and can be detected using an array detector, or by allowing a particular species to exit through a slit in the exit plate. The particular species can be chosen by changing the total electric field applied within the drift tube, or the gas flow rate, or both.

Many DMAs are equipped with an exit slit and a single detector element behind that slit, rather than an array of detectors. Therefore, in some examples, the arrays of detectors 1908 and 2008 in FIGS. 19, 20A and 20B can be replaced by a slit and detector, for detecting ions at one distance from the path.

The present disclosure provides a means for improving such known DMAs, by creating a second electric field component (e.g. an RF field across this analyser, for instance in the z direction). Such an arrangement can be provided using strip electrodes that are separated in z about the ion axis, the strip electrodes having static voltages to assist in defining the DMA field, and RF voltages across the axis from one side plate to the other, to drive ions to oscillate in the z-direction. The use of such fields together with gas flow ion provides increased separation of ions and allows the degree of ion separation to be controlled by numerous parameters which can be selected based on the sample of interest. For instance, the gas flow rate, flow direction, pressure and type of gas used can be varied. These provide additional parameters for controlling the ion separation, in addition to the control provided by the second electric field components described herein. Hence, improved DMAs are also provided by this disclosure.

The following numbered clauses provide, in general terms, various advantageous implementations of the method 1800 and ion mobility spectrometer 1900 of FIGS. 18 and 19. The numbered clauses also provide, in general terms, examples of advantageous implementations of the apparatus of FIGS. 20A and 20B.

1. A method of separating a sample of ions according to their ion mobilities, the method comprising:
receiving the sample of ions into a drift tube;
applying a first electric field component within the drift tube so as to cause the sample of ions to move along a path within the drift tube towards a detector arrangement, whereby the sample of ions separates along the path;
applying a second electric field component within the drift tube, the first and second electric field components having a combined electric field strength to modify the ion mobility of at least a portion of the sample of ions and to cause at least a portion of the sample of ions to move away from the path; and
detecting ions incident on the detector arrangement at a plurality of distances from the path.

2. The method of clause 1, wherein the detector arrangement comprises a plurality of detector elements.

3. The method of clause 1 or clause 2, wherein the step of detecting ions comprises recording data indicative of the number of ions incident upon the detector arrangement over time.

4. The method of any preceding clause, wherein the step of detecting ions comprises recording data indicative of the number of ions incident upon the detector arrangement over time together with data indicative of the position of incidence on the detector arrangement.

5. The method of any preceding clause, wherein the second electric field component comprises a transverse part for at least a part of the length of the path, the transverse part being perpendicular to the path.

6. The method of clause 5, wherein the transverse part is directed in a first direction that is perpendicular to the path during a first time period, and subsequently directed in a second direction that is opposite the first direction during a second time period, preferably wherein the method comprises alternating the direction of the transverse part one or a plurality of times.

7. The method of clause 5 or clause 6, wherein the transverse part comprises an asymmetric time-varying electric field component.

8. The method of any of clauses 5 to 7, wherein the transverse part varies according to: a triangular waveform; a rounded triangular waveform; a sawtooth waveform; a rounded sawtooth waveform; a pulsed waveform; and/or a rounded pulsed waveform.

9. The method of any of clauses 5 to 8, wherein applying the second electric field component causes the sample of ions to move away from the path by less than a transverse dimension of the drift tube and preferably by less than a transverse dimension of the detector arrangement.

10. The method of any of clauses 5 to 9, wherein the transverse part varies with a frequency of from 10 kHz to 100 MHz, preferably from 25 kHz to 10 MHz, preferably from 50 kHz to 5 MHz, and more preferably from 100 kHz to 1 MHz.

11. The method of any of clauses 2 to 10, wherein the transverse part is time-invariant and symmetric for at least a part of the length of the path.

12. The method of any preceding clause, wherein the second electric field component comprises a longitudinal part for at least a part of the length of the path, the longitudinal part being directed along the path so as to accelerate at least a portion of the ions in the direction of the path.

13. The method of clause 12, wherein the longitudinal part comprises an asymmetric time-varying electric field component.

14. The method of clause 12 or clause 13, wherein the longitudinal part comprises a symmetric time-varying electric field component.

15. The method of any of clauses 12 to 14, wherein the longitudinal part varies according to: a sinusoidal waveform; a square waveform; a rounded square waveform; a triangular waveform; a rounded triangular waveform; a sawtooth waveform; a rounded sawtooth waveform; a pulsed waveform; and/or a rounded pulsed waveform.

16. The method of any of clauses 12 to 15, wherein the longitudinal part varies with a frequency of from 1 kHz to 100 MHz, preferably from 1 kHz to 10 MHz, preferably from 2.5 kHz to 1 MHz, preferably from 5 kHz to 500 kHz, and more preferably from 50 kHz to 100 kHz.

17. The method of any of clauses 12 to 16, wherein the longitudinal part comprises a time-invariant electric field component.

18. The method of any of clauses 12 to 17, wherein the longitudinal part comprises a DC electric field component at one or both ends of the path.

19. The method of any preceding clause, wherein the amplitude of the second electric field component is greater at or near the detector arrangement than at: the centre of the path; and/or the end of the path distal the detector arrangement.

20. The method of any preceding clause, wherein applying the first and/or second electric field components comprises applying a voltage to an electrode arrangement preferably comprising strip, planar and/or ring-shaped electrodes.

21. The method of clause 20, wherein the electrode arrangement comprises at least a pair of capacitively coupled electrodes, wherein applying the second electric field component comprises applying a voltage having a first phase to one electrode of the pair whilst applying an opposite phase to the other electrode of the pair.

22. The method of any preceding clause, comprising applying the second electric field component for only a part of the length of the path; or less than or equal to 10% of the length of the path; or less than or equal to 25% of the length of the path; or less than or equal to 50% of the length of the path; or 50% or more of the length of the path; or 75% or more of the length of the path; or all of the length of the path.

23. The method of any preceding clause, wherein applying the first and second electric field components comprises causing:
an electric field strength at atmospheric pressure within the drift tube of greater than or equal to: $10^5$ V/m; $2.5\times10^5$ V/m; or $5\times10^5$ V/m; or $10^6$ V/m; or $1.1\times10^6$ V/m; or $1.2\times10^6$ V/m; or $1.5\times10^6$ V/m; or $2\times10^6$ V/m; or $3\times10^6$ V/m; or $5\times10^6$ V/m; or $10^7$ V/m; and/or
a normalised electric field strength within the drift tube at atmospheric pressure or other pressures of greater than or equal to: $3.7\times10^{-21}$ V·m$^2$; $9.3\times10^{-21}$ V·m$^2$; or $1.9\times10^{-20}$ V·m$^2$; or $3.7\times10^{-20}$ V·m$^2$; or $4.1\times10^{-20}$ V·m$^2$; or $4.5\times10^{-20}$ V·m$^2$; or $5.6\times10^{-20}$ V·m$^2$; or $7.4\times10^{-20}$ V·m$^2$; or $1.1\times10^{-19}$ V·m$^2$; or $1.9\times10^{-19}$ V·m$^2$; or $3.7\times10^{-19}$ V·m$^2$.

24. The method of any preceding clause, wherein applying the first and second electric field components accelerates at least a portion of the sample of ions to a substantial fraction of the speed of sound in the drift tube.

25. The method of any preceding clause, wherein the first electric field component is constant along the path, or has a constant gradient along the path, or has a gradient that varies along the path.

26. The method of any preceding clause, wherein applying the first electric field component comprises applying a drift tube field.

27. The method of any preceding clause, wherein the path extends between an inlet of the drift tube and the detector arrangement.

28. The method of any preceding clause, wherein the path is a curved path or a straight path.

29. The method of any preceding clause, wherein the path is an axis within the drift tube, preferably wherein the path is the longitudinal drift tube axis.

30. The method of any preceding clause, wherein the drift tube is at: above atmospheric pressure; atmospheric pressure; or below atmospheric pressure.

31. The method of any preceding clause, further comprising a step of adjusting the degree of separation of the sample of ions by adjusting one or more properties of the first and/or second electric field components, wherein the one or more properties preferably comprise one or more of: amplitude; frequency; phase; and/or waveform.

32. The method of any preceding clause, further comprising providing a gas flow within the drift tube, preferably wherein detecting ions incident on the detector arrangement at a plurality of distances from the path comprises detecting ions that have separated in the direction of the gas flow within the drift tube.

33. The method of clause 32, comprising adjusting a flow rate of the gas flow.

34. The method of clause 32 or clause 33, wherein the gas flow is substantially perpendicular to: the path and/or; an axis within the drift tube, preferably the drift tube axis.

35. The method of any of clauses 32 to 34, wherein the gas flow is substantially perpendicular to the second electric field component.

36. The method of any of clauses 32 to 35, wherein providing the gas flow causes at least a portion of the sample of ions to separate in the direction of the gas flow.

37. A method of performing ion mobility spectrometry or obtaining a differential mobility analyser data set, comprising performing the method of any preceding clause a plurality of times to obtain a plurality of ion mobility spectra or differential mobility analyser data sets, each ion mobility spectrum or differential mobility analyser data set being obtained using:
   second electric field components having different electric field strengths;
   second electric field components applied for different proportions of time;
   second electric field components that are applied over portions of the drift tube having different lengths; and/or
   different rates and/or directions of gas flow within the drift tube.

38. The method of any preceding clause, further comprising a step of ionising a sample to generate the sample of ions prior to receiving the sample of ions into the drift tube.

39. A database comprising at least one spectrum obtained using the method of any preceding clause, preferably wherein the database comprises one or more properties of the first and/or second electric field components associated with the at least one spectrum.

40. A method of identifying one or more species within a sample of ions, the method comprising:
   comparing an ion mobility spectrum or differential mobility analyser data set for the sample of ions obtained using the method of any of clauses 1 to 38 against a reference ion mobility spectrum or differential mobility analyser data set; and identifying one or more species within the sample of ions based on the comparison.

41. The method of clause 40, wherein the comparison comprises comparing ion mobility spectra or differential mobility data sets obtained using second electric field components having the same electric field strength.

42. An apparatus for separating a sample of ions according to their ion mobilities, comprising:
   a drift tube for receiving the sample of ions;
   an electrode arrangement;
   a detector arrangement; and
   a controller configured to:
      cause the electrode arrangement to apply a first electric field component within the drift tube so as to cause the sample of ions to move along a path within the drift tube, whereby the sample of ions separates along the path; and
      cause the electrode arrangement to apply a second electric field component within the drift tube, the second electric field components having a higher electric field strength than the first electric field component, to modify the ion mobility of at least a portion of the sample of ions and to cause at least a portion of the sample of ions to move away from the path;
   wherein the detector arrangement is configured to detect ions incident on the detector arrangement at a plurality of distances from the path.

43. The apparatus of clause 42, wherein the controller is further configured to cause the ion mobility spectrometer to perform the method of any of clauses 2 to 36.

44. The apparatus of clause 42 or clause 43, further comprising an ion source for providing the sample of ions, wherein the controller is further configured to cause the ion mobility spectrometer to perform the method of clause 38.

45. The apparatus of any of clauses 42 to 44, wherein the apparatus is an ion mobility spectrometer or a differential mobility analyser.

46. An ion-mobility spectrometry-mass spectrometer comprising:
   the apparatus of clause 45, wherein the apparatus is an ion mobility spectrometer; and
   a mass spectrometer configured to receive separated ions from the ion mobility spectrometer.

47. A computer program comprising instructions to cause the apparatus of any of clauses 42 to 46 to execute the steps of the method of any of clauses 1 to 38.

48. A computer program comprising instructions that, when the program is executed by a computer, cause the computer to carry out the method of clause 40 or clause 41.

49. A computer-readable data carrier having stored thereon the computer program of clause 47 or clause 48.

It can be seen therefore that the foregoing methods and apparatus provide a number of advantages over existing systems. For example, full transmission of ions (i.e. no filtering of ions) and enhanced ability to identify ion mobility peaks are common advantages to the described methods and apparatus. Moreover, certain implementations provide the ability to perform FAIMS with an ion mobility drift tube. For instance, the comparison of spectra with differing degrees of differential mobility separation can yield FAIMS spectrum.

The described methods and apparatus provide simultaneous ion mobility separation and differential ion mobility separation, with variable differential mobility separation able so as to split otherwise unresolvable peaks by a varying amount. Moreover, differential mobility can be derived from comparison of spectra and all ions of a given charge polarity have been collected. Simultaneous ion mobility and differential ion mobility may also be provided.

The apparatus disclosed herein are capable of obtaining standard spectra with which peaks may be compared (when the second electric field component turned off). The comparison of spectra with and without the mobility variance applied is a capability not utilised in conventional DT-IMS and is usually not possible in conventional FAIMS/DMS apparatus.

It will be appreciated that many variations may be made to the above methods and apparatus whilst retaining these advantages. For example, whilst the above embodiments have been described with a stationary gas, this is primarily to simplify the analysis. It will be understood that the gas within the drift tube may be stationary or its flow rate may be variable and adjustable. If the flow rate is variable then the attainment of a given flow rate may be dependent on the drift tube size, electrode geometry and/or other properties of the system.

Furthermore, the drift tubes described herein include strip electrodes 504a and 504b on opposing substrates spaced apart by 1.20 mm. However, other dimensions may be used. For example, drift tubes that are up to 0.5 mm wide can be used, or up to 1.5 mm, or up to 5 mm. The drift tubes dimensions may be chosen so as to ensure that ions are caused to undergo a change in mobility without striking the electrodes.

Moreover, whilst the embodiments described above use ions having certain masses, there is no limit to ion size. It follows from the equations of this disclosure that ions of any size can be analysed using the methods and apparatus described above.

It will also be understood that although the disclosure has been described with reference to particular types of data, devices and applications, and whilst the disclosure provides particular advantages in such cases, as discussed herein the disclosure may be applied to other types of data, devices and applications. For instance, type A, type B and/or type C ions can be analysed using the methods and apparatus of the disclosure.

It will also be appreciated that the detector arrangements described herein can be replaced by a slit or aperture. For instance, some embodiments described herein cause ions to move away from the drift tube axis (e.g. using a second electric field component, as in FIGS. 18 and 19, or using a gas flow, as in FIGS. 20A and 20B). In such cases, a detector can be provided outside the drift tube, with only those ions that pass through the slit or aperture of the drift tube leaving the drift tube and thus reaching the detector. The fact that ions have exited through the slit or aperture and arrive at the detector at a certain time, under certain field and gas flow conditions, can be used to infer certain properties of the ions that exit the slit.

The present disclosure provides numerous apparatus for separating a sample of ions according to their ion mobilities, using the first and second field components described previously. Also provided are methods of using such apparatus. For example, the present disclosure also encompasses the use any of the apparatus described herein to: separate ions; increase the separation of a sample of ions; perform ion mobility spectrometry; and/or obtain a differential mobility analyser data set; based on the non-linear mobility (e.g. the non-linear mobility variance) of the ions. The present disclosure also encompasses the use of first and second electric field components to modify the ion mobility of at least a portion of a sample of ions and to increase the separation of at least a portion of the sample of ions along a path (e.g. a path through a drift tube), based on the non-linear mobility (e.g. the non-linear mobility variance) of the ions, the second electric field component substantially not causing a net change in the velocity of the sample of ions perpendicular to the path.

Each feature disclosed in this specification, unless stated otherwise, may be replaced by alternative features serving the same, equivalent or similar purpose. Thus, unless stated otherwise, each feature disclosed is one example only of a generic series of equivalent or similar features.

As used herein, including in the claims, unless the context indicates otherwise, singular forms of the terms herein are to be construed as including the plural form and, where the context allows, vice versa. For instance, unless the context indicates otherwise, a singular reference herein including in the claims, such as "a" or "an" (such as an ion or an electric field) means "one or more" (for instance, one or more ions, or one or more electric fields). Throughout the description and claims of this disclosure, the words "comprise", "including", "having" and "contain" and variations of the words, for example "comprising" and "comprises" or similar, mean "including but not limited to", and are not intended to (and do not) exclude other components.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

The invention claimed is:

1. A method of separating a sample of ions according to their ion mobilities, the method comprising:
   receiving the sample of ions into a drift tube;
   applying a first electric field component within the drift tube so as to cause the sample of ions to move along a path within the drift tube, whereby the sample of ions separates along the path;
   applying a second electric field component within the drift tube, the first and second electric field components having a combined electric field strength to modify the ion mobility of at least a portion of the sample of ions and to increase the separation of at least a portion of the sample of ions along the path, the second electric field component substantially not causing a net change in the velocity of the sample of ions perpendicular to the path; and
   wherein applying the first and second electric field components comprises causing an electric field strength within the drift tube of greater than or equal to: $5\times10^6$ V/m.

2. The method of claim 1, wherein the second electric field component comprises a transverse part for at least a part of the length of the path, the transverse part being perpendicular to the path.

3. The method of claim 2, wherein the transverse part is directed in a first direction that is perpendicular to the path during a first time period, and subsequently directed in a second direction that is opposite the first direction during a second time period.

4. The method of claim 2, wherein the transverse part is a symmetric time-varying electric field component.

5. The method of claim 2, wherein the transverse part varies according to: a sinusoidal waveform; a square waveform; a rounded square waveform; a triangular waveform; and/or a rounded triangular waveform.

6. The method of claim 5, wherein the transverse part varies with a frequency of from 50 kHz to 5 MHz.

7. The method of claim 2, wherein applying the second electric field component causes the sample of ions to move away from the path by less than a transverse dimension of the drift tube.

8. The method of claim 2, wherein the transverse part is time-invariant and symmetric for at least a part of the length of the path.

9. The method of claim 1, wherein the second electric field component comprises a longitudinal part for at least a part of the length of the path, the longitudinal part being directed along the path so as to accelerate at least a portion of the ions in the direction of the path.

10. The method of claim 9, wherein the longitudinal part comprises an asymmetric time-varying electric field component.

11. The method of claim 9, wherein the longitudinal part comprises a symmetric time-varying electric field component.

12. The method of claim 9, wherein the longitudinal part varies according to: a sinusoidal waveform; a square waveform; a rounded square waveform; a triangular waveform; a rounded triangular waveform; a sawtooth waveform; a rounded sawtooth waveform; a pulsed waveform; and/or a rounded pulsed waveform.

13. The method of claim 9, wherein the longitudinal part varies with a frequency of from 2.5 kHz to 1 MHz.

14. The method of claim 9, wherein the longitudinal part comprises a time-invariant electric field component.

15. The method of claim 9, wherein the longitudinal part comprises a time-invariant electric field component at one or both ends of the path.

16. The method of claim 1, wherein the amplitude of the second electric field component is greater at the centre of the path than at one or both ends of the path.

17. The method of claim 1, wherein applying the first and/or second electric field components comprises applying a voltage to an electrode arrangement comprising an arrangement of strip, planar electrodes, ring-shaped electrodes, or a combination thereof.

18. The method of claim 17, wherein the electrode arrangement comprises at least a pair of capacitively coupled electrodes, wherein applying the second electric field component comprises applying a voltage having a first phase to one electrode of the pair whilst applying an opposite phase to the other electrode of the pair.

19. The method of claim 1, comprising applying the second electric field component for only a part of the length of the path; or less than or equal to 10% of the length of the path; or less than or equal to 25% of the length of the path; or less than or equal to 50% of the length of the path; or 50% or more of the length of the path; or 75% or more of the length of the path; or all of the length of the path.

20. The method of claim 1, wherein the first electric field component is constant along the path, or has a constant gradient along the path, or has a gradient that varies along the path.

21. The method of claim 1, further comprising a step of adjusting the degree of separation of the sample of ions by adjusting one or more properties of the first and/or second electric field components, wherein the one or more properties comprises amplitude; frequency; phase; waveform, or a combination thereof.

22. The method of claim 1, further comprising performing ion mobility spectrometry by detecting the separated sample of ions using a detector.

23. The method of claim 22, further comprising recording data indicative of the number of ions incident upon the detector over time.

24. The method of claim 22, further comprising a plurality of times to obtain a plurality of ion mobility spectra, each ion mobility spectrum being obtained using:
second electric field components having different electric field strengths;
second electric field components applied for different proportions of time; and/or
second electric field components that are applied over portions of the drift tube having different lengths.

25. An apparatus for separating a sample of ions according to their ion mobilities, the apparatus comprising:
a drift tube for receiving the sample of ions;
an electrode arrangement; and
a controller configured to:
cause the electrode arrangement to apply a first electric field component within the drift tube so as to cause the sample of ions to move along a path within the drift tube, whereby the sample of ions separates along the path; and
cause the electrode arrangement to apply a second electric field component within the drift tube, the first and second electric field components having a combined electric field strength to modify the ion mobility of at least a portion of the sample of ions and to increase the separation of at least a portion of the sample of ions along the path, the second electric field component substantially not causing a net change in the velocity of the sample of ions perpendicular to the path,
wherein causing the electrode arrangement to apply the first and second electric field components comprises causing the electrode arrangement to produce an electric field strength within the drift tube of greater than or equal to: $5 \times 10^6$ V/m.

26. The apparatus of claim 25, wherein the second electric field component comprises a transverse part for at least a part of the length of the path, the transverse part being perpendicular to the path, and wherein the transverse part is directed in a first direction that is perpendicular to the path during a first time period, and subsequently directed in a second direction that is opposite the first direction during a second time period.

27. The apparatus of claim 25, for separating ions having a mobility μ, wherein a transverse spacing D of the electrode arrangement and/or the drift tube is given by:

$$D \geq \frac{2\mu \cdot E_0}{\omega}$$

wherein $E_0$ is a peak electric field strength transverse to the path of the ions and ω is a frequency of an electric field generated by the electrode arrangement.

* * * * *